United States Patent
Hashima et al.

(10) Patent No.: US 8,059,120 B2
(45) Date of Patent: Nov. 15, 2011

(54) IMAGE PROCESS APPARATUS FOR THREE-DIMENSIONAL MODEL

(75) Inventors: Masayoshi Hashima, Kawasaki (JP); Yuichi Sato, Kawasaki (JP); Yuichi Arita, Kawasaki (JP); Naoyuki Nozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 665 days.

(21) Appl. No.: 11/553,171

(22) Filed: Oct. 26, 2006

(65) Prior Publication Data
US 2007/0291032 A1   Dec. 20, 2007

(30) Foreign Application Priority Data
Jun. 19, 2006  (JP) .................................. 2006-169014

(51) Int. Cl.
*G06T 17/00* (2006.01)
(52) U.S. Cl. ............ 345/420; 345/419; 700/96; 700/97; 700/98; 700/182; 703/1
(58) Field of Classification Search .................. 345/419, 345/646, 204, 424; 264/40.1
See application file for complete search history.

(56) References Cited

U.S. PATENT DOCUMENTS

| | | | |
|---|---|---|---|
| 4,710,876 A | 12/1987 | Cline et al. | |
| 4,885,688 A | 12/1989 | Crawford | |
| 4,893,260 A | 1/1990 | Arakawa | |
| 5,428,717 A * | 6/1995 | Glassner | 345/423 |
| 6,229,545 B1 * | 5/2001 | Satoh | 345/419 |
| 6,266,064 B1 * | 7/2001 | Snyder | 345/421 |
| 6,556,199 B1 * | 4/2003 | Fang et al. | 345/424 |
| 6,629,065 B1 * | 9/2003 | Gadh et al. | 703/1 |
| 6,917,842 B2 * | 7/2005 | Shimizu et al. | 700/96 |
| 6,968,299 B1 * | 11/2005 | Bernardini et al. | 703/2 |
| 7,054,701 B2 * | 5/2006 | Shimizu et al. | 700/98 |
| 7,379,057 B2 * | 5/2008 | Kobayashi et al. | 345/204 |
| 7,583,829 B2 | 9/2009 | Kiraly et al. | |
| 2002/0059049 A1 * | 5/2002 | Bradbury et al. | 703/11 |
| 2002/0167101 A1 * | 11/2002 | Tochimoto et al. | 264/40.1 |
| 2004/0113918 A1 * | 6/2004 | Nishiuwatoko | 345/589 |
| 2004/0125116 A1 * | 7/2004 | Lee et al. | 345/646 |

(Continued)

FOREIGN PATENT DOCUMENTS

JP    63-177270 A    7/1988

(Continued)

OTHER PUBLICATIONS

"Japanese Office Action" mailed by JPO and corresponding to Japenese application No. 2006-169014 on May 17, 2011, with English translation.

(Continued)

*Primary Examiner* — Jeffery A Brier
*Assistant Examiner* — Phi Hoang
(74) *Attorney, Agent, or Firm* — Fujitsu Patent Center

(57) ABSTRACT

A calculation area including a three-dimensional (3D) product model is specified, and a plurality of cross-sectional images is cut out from the calculation area. Each cross-sectional image is divided into plural pieces of voxel data, and voxel data of a gap area of the inside of a product is generated from the plural pieces of voxel data. A 3D model of the gap area of the inside of the product is generated, and also a volume of the gap area of the inside of the product is calculated, based on the voxel data of the gap area obtained by each cross-sectional image.

18 Claims, 39 Drawing Sheets

U.S. PATENT DOCUMENTS

| | | | |
|---|---|---|---|
| 2004/0165760 A1 | 8/2004 | Veneruso | |
| 2005/0151734 A1* | 7/2005 | Gubkin et al. | 345/424 |
| 2005/0225551 A1* | 10/2005 | Shimizu et al. | 345/419 |
| 2006/0056685 A1 | 3/2006 | Kiraly et al. | |
| 2006/0199153 A1* | 9/2006 | Liu et al. | 433/213 |
| 2006/0204079 A1* | 9/2006 | Yamaguchi | 382/154 |

FOREIGN PATENT DOCUMENTS

| | | |
|---|---|---|
| JP | 08-153214 | 6/1996 |
| JP | 2000-024754 | 1/2000 |
| JP | 3265879 | 1/2002 |
| JP | 2006-81906 A | 3/2006 |

OTHER PUBLICATIONS

Partial European Search Report mailed Aug. 2, 2011 for corresponding European Application No. 06255496.9.

Carsten, Maple "Geometric Desing and Space Planning Using the Marching Squares and Marching Cube Algorithms", Proceedings of the 2003 International Conference on Geometric Modeling and Graphics (GMAG '03), Department of Computing and Information Systems, University of Luton, U.K., 2003.

Hare, J. J. et al., "Volumetric Measurements from an Iso-Surface Algorithm", Proceedings of The SPIE—The International Society for Optical Engineering SPIE-Int. Soc. Opt. Eng. USA, vol. 3643, 1999, pp. 206-210.

Lorensen, W. E. et al., "Marching Cubes: A High Resolution 3D Surface Construction Algorithm", Siam Journal on Computing, Society for Industrial and Applied Mathematics, Anaheim, U.S., Computer Graphics, vol. 21, No. 4, Jul. 27, 1987, pp. 163-169.

Youwei, Zhang et al., "Direct Surface Extraction from 3D Freehand Ultrasound Images", Vis 2002. IEEE Visualization 2002. Proceeding. Boston, MA, Oct. 27-Nov. 1, 2002; New York, NY: IEEE, US, Jan. 1, 2002, pp. 45-52.

* cited by examiner

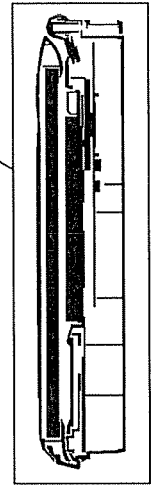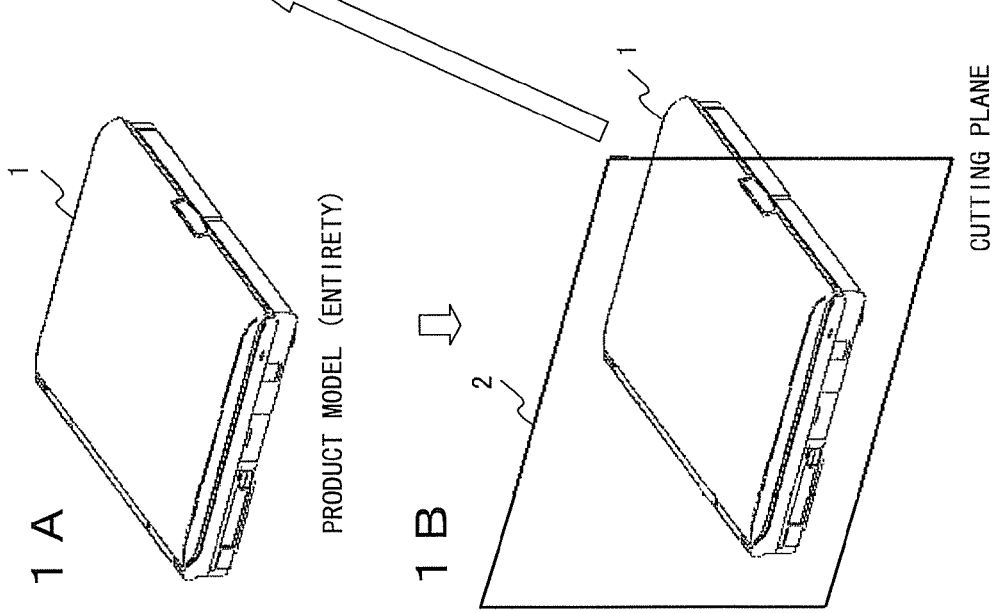

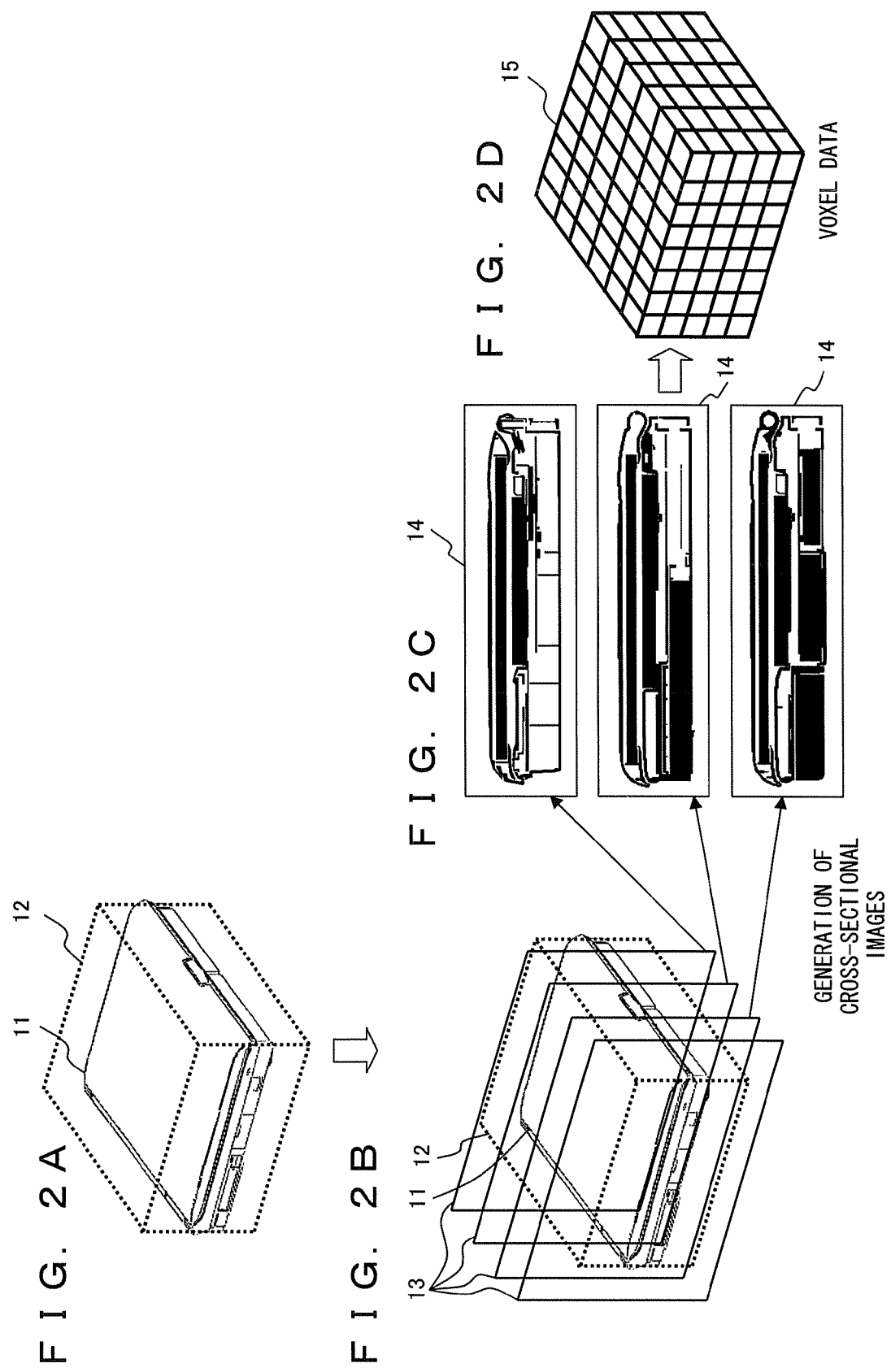

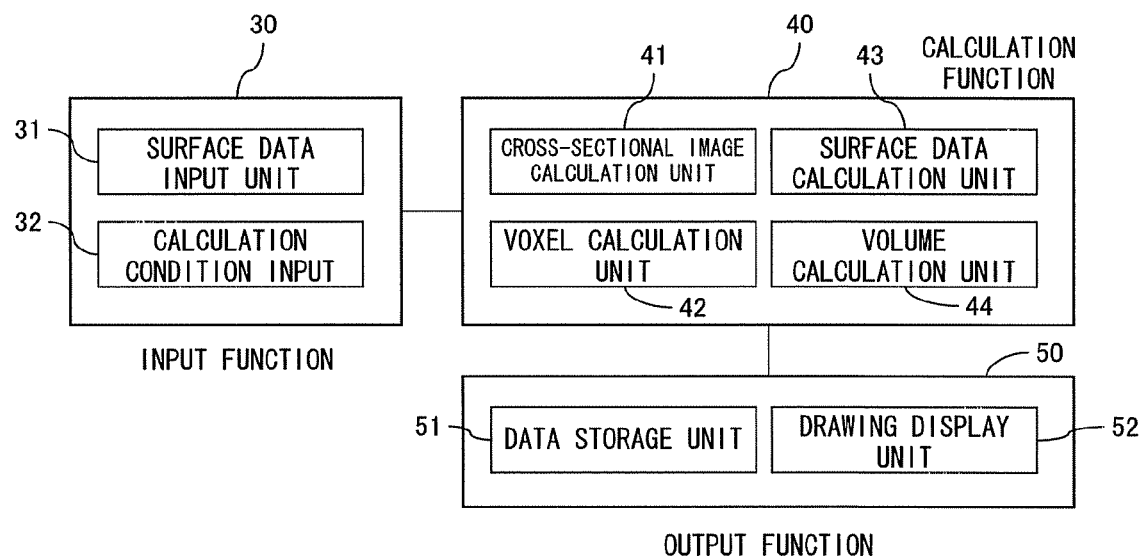
F I G. 4

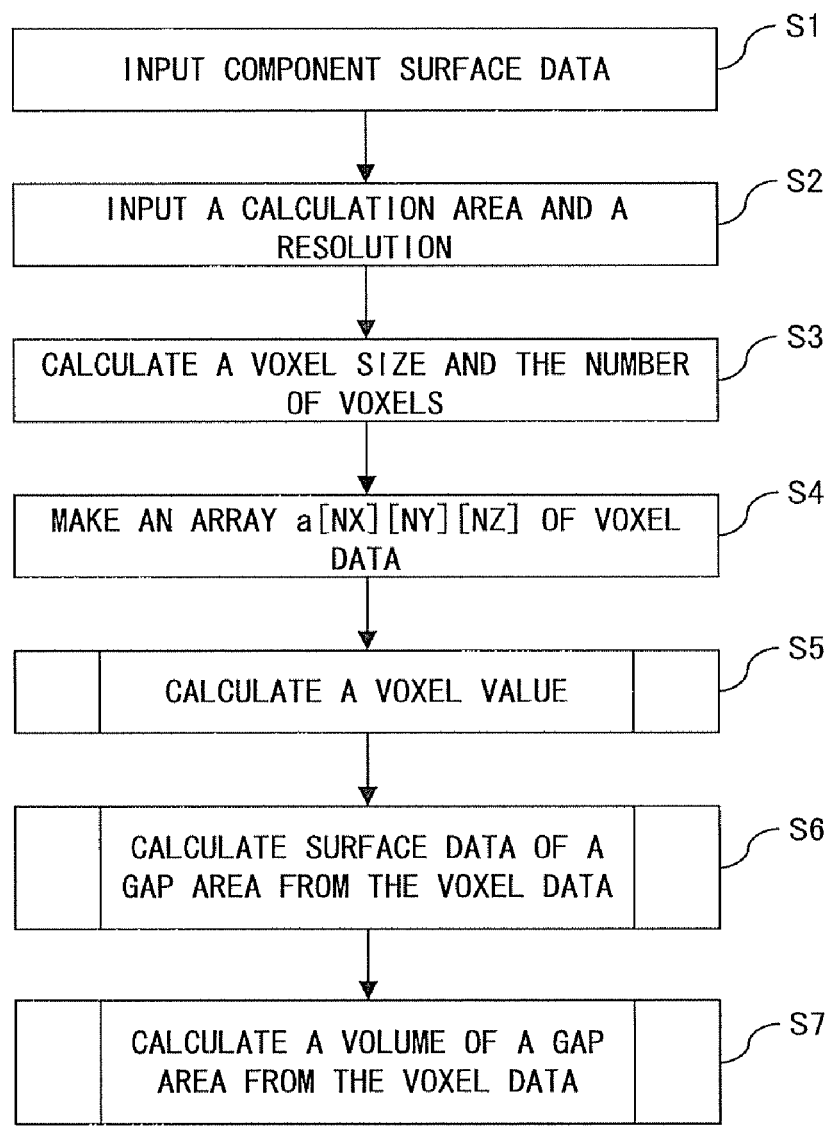
F I G. 5

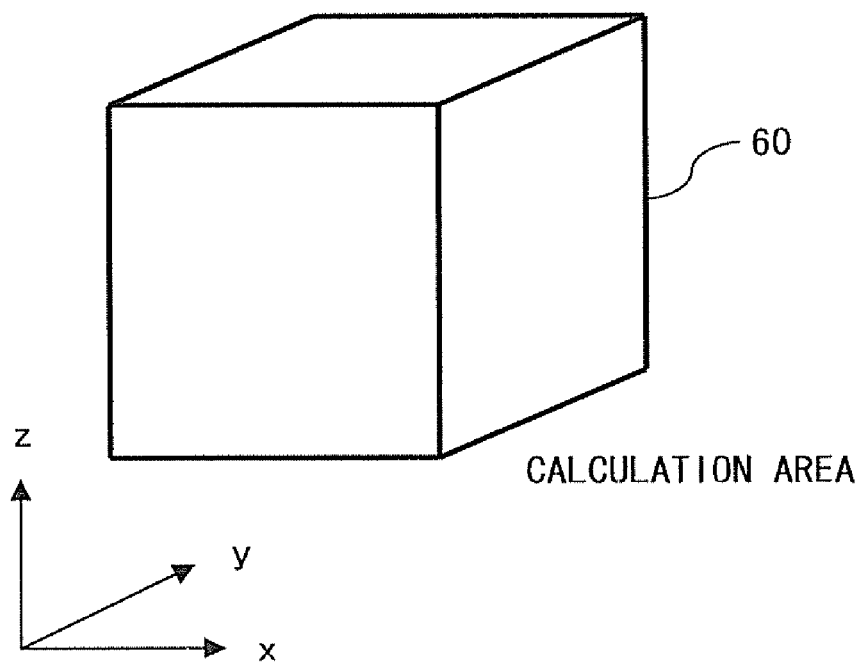
F I G. 6

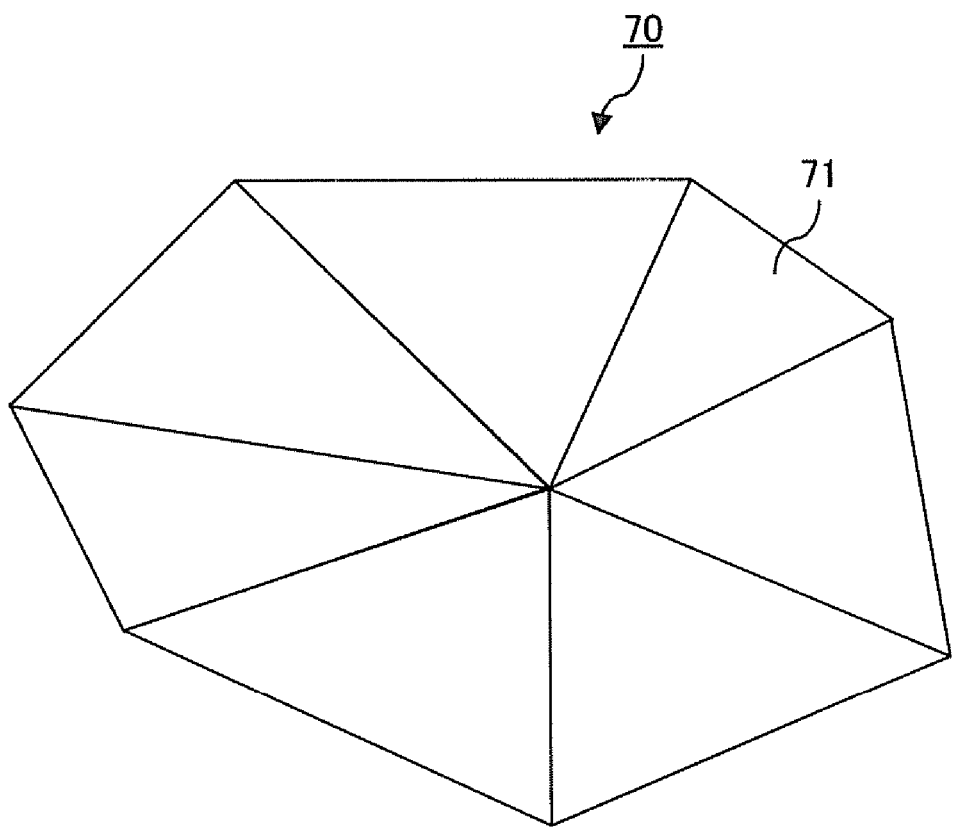
F I G. 8

FOR i= 1 THROUGH Nx-1, j= 1 THROUGH Ny-1, AND k= 1 THROUGH Nz-1:

STRUCTURE A CUBOID (i.e., A CELL) WITH ITS APEXES BEING THE RESPECTIVE CENTERS OF EIGHT VOXELS, i.e., A[i][j][k], A[i][j][k+1], A[i][j+1][k], A[i][j+1][k+1], A[i+1][j][k], A[i+1][j][k+1], A[i+1][j+1][k] AND A[i+1][j+1][k+1] — S21

OBTAIN VOXEL VALUES Cm (WHERE m= 1 THROUGH 8) OF EIGHT APEXES Vm OF THE CELL. — S22

SEARCH A TRIANGLE PATTERN CORRESPONDING TO A COMBINATION OF {C1, C2 THROUGH C8} — S23

CALCULATE APEX POSITIONS OF EACH TRIANGLE — S24

STORE DATA OF A TRIANGLE — S25

FIG. 12

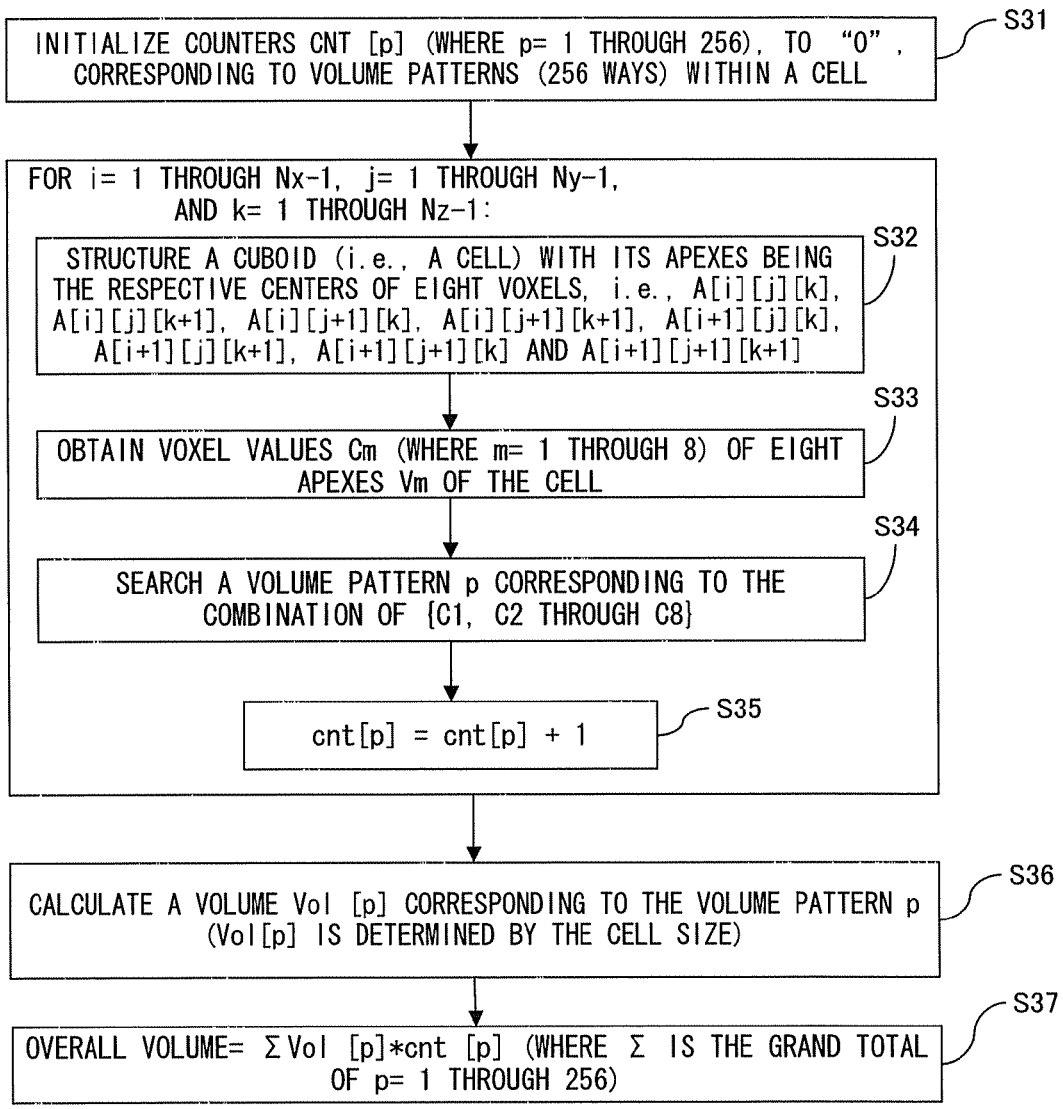
F I G. 1 6

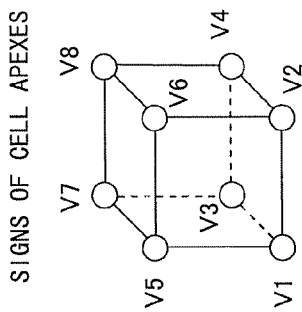
FIG. 17A SIGNS OF CELL APEXES
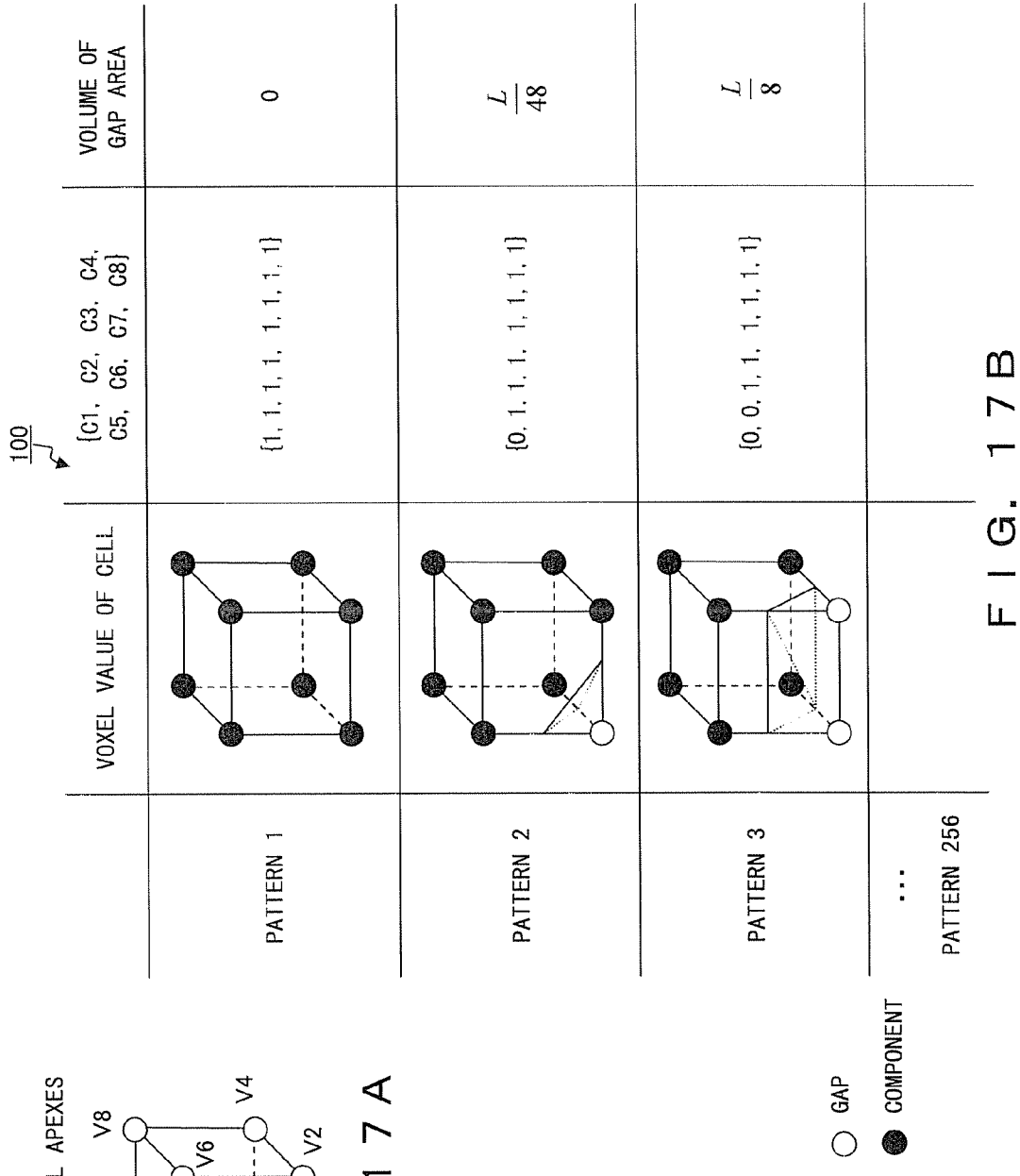
FIG. 17B
○ GAP
● COMPONENT

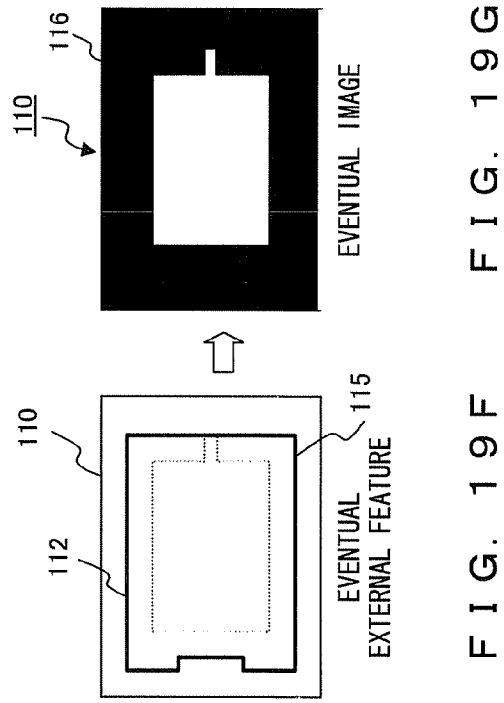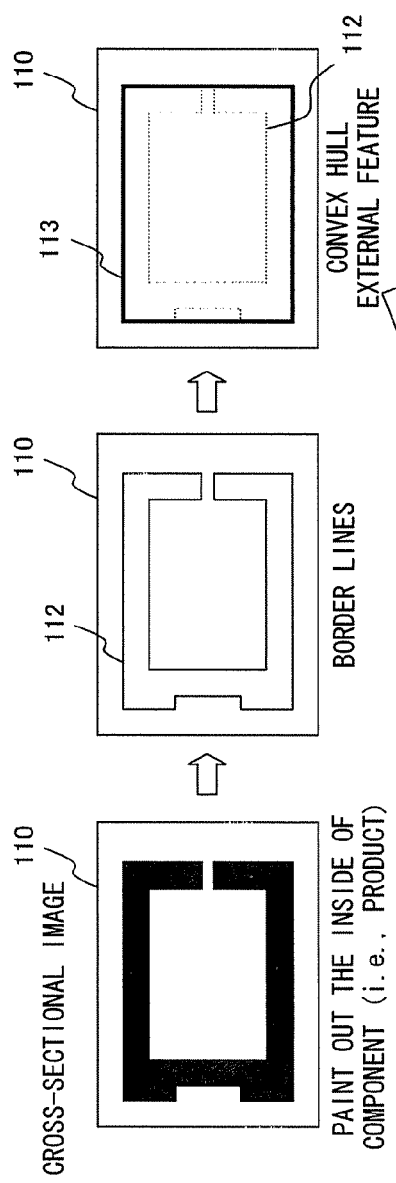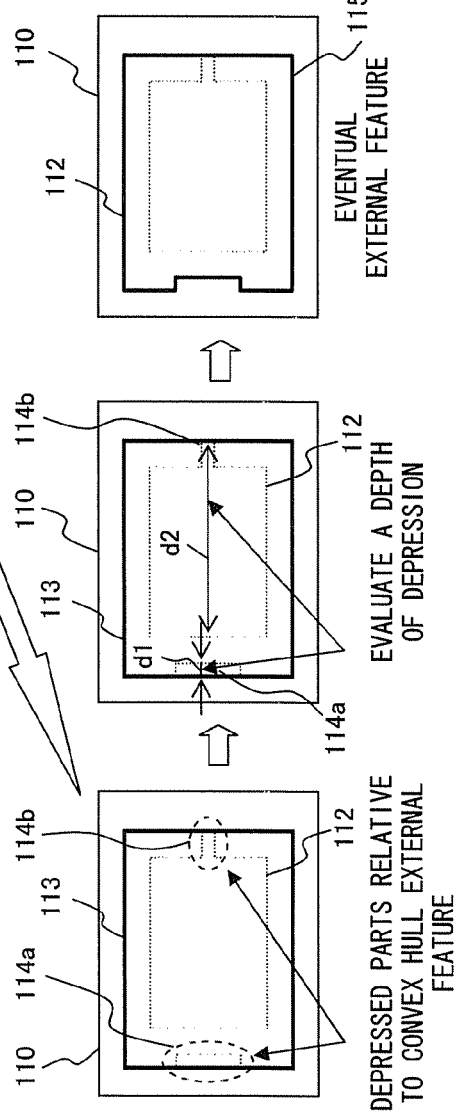

CONNECTION OF CELLS OF THE
SAME PLANE (x DIRECTION)
CUBOID AFTER CONNECTION
FIG. 22A
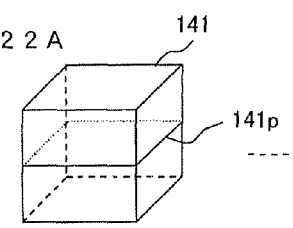
FIG. 22D
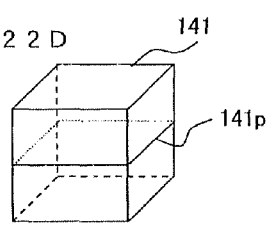
FIG. 22B
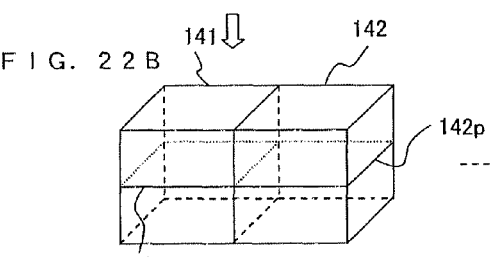
FIG. 22E
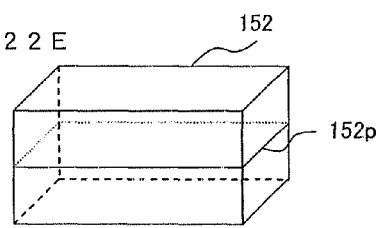
FIG. 22C
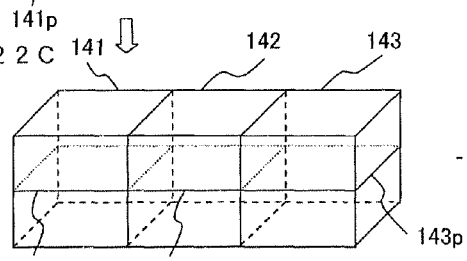
FIG. 22F
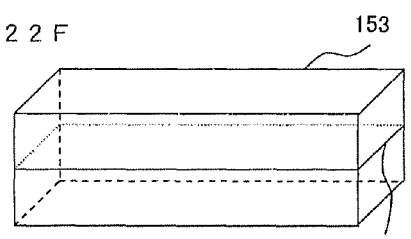

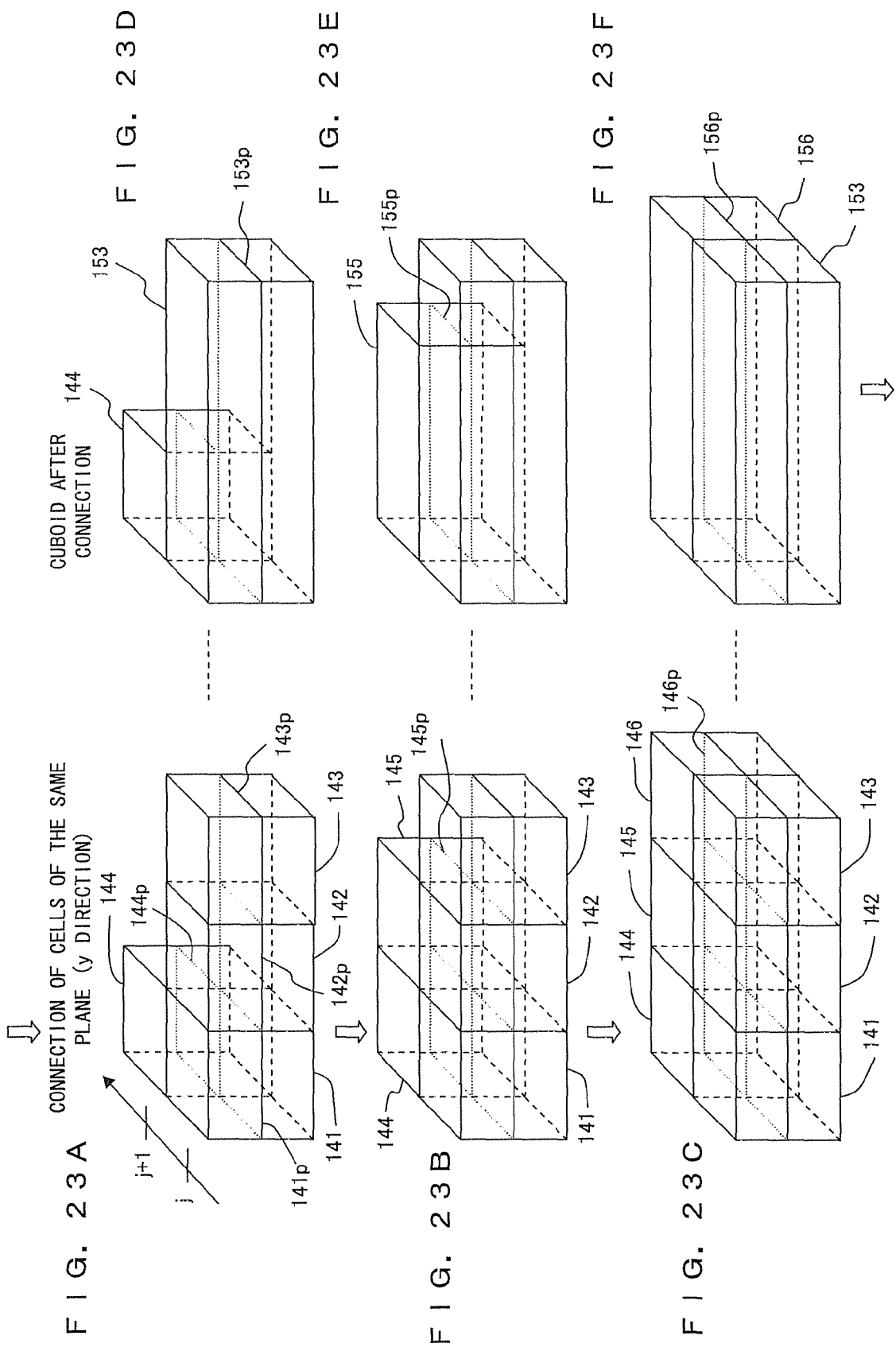

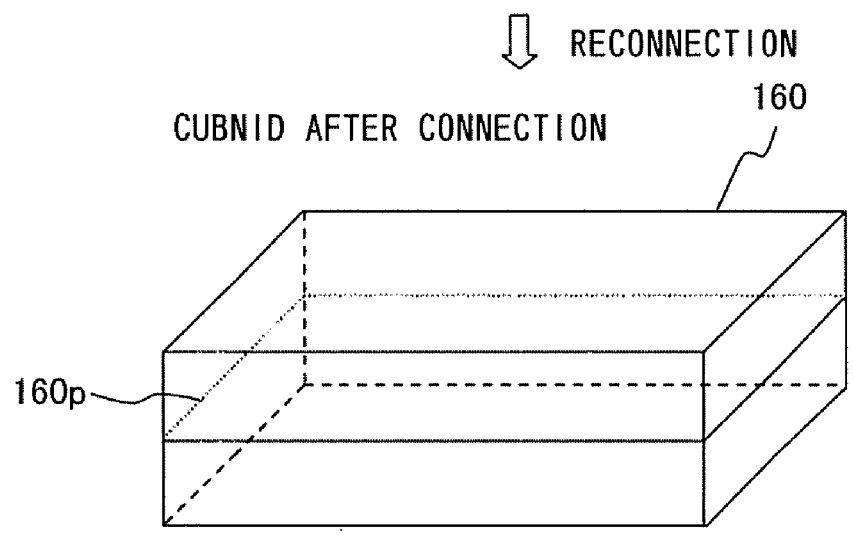
F I G. 2 4

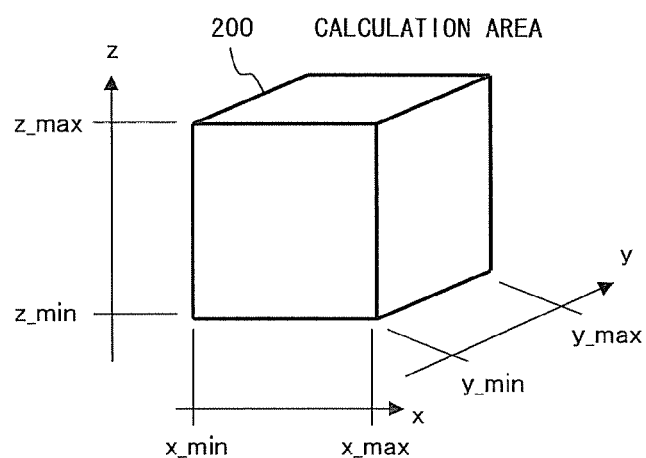
F I G. 26 A
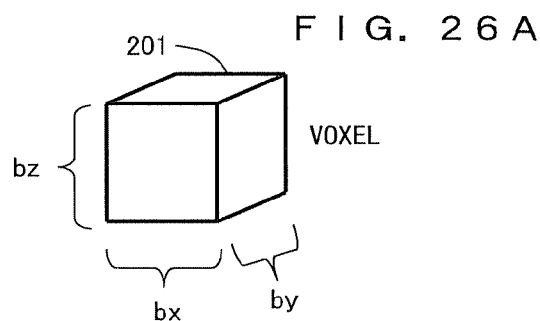
F I G. 26 B
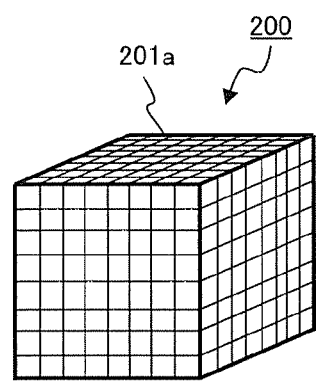
VOXEL DATA SPECIFIED BY A
COARSE RESOLUTION
F I G. 26 C
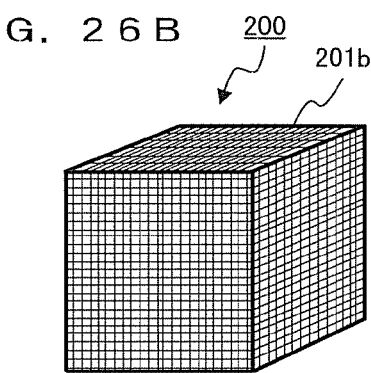
VOXEL DATA SPECIFIED BY A FINE
RESOLUTION
F I G. 26 D

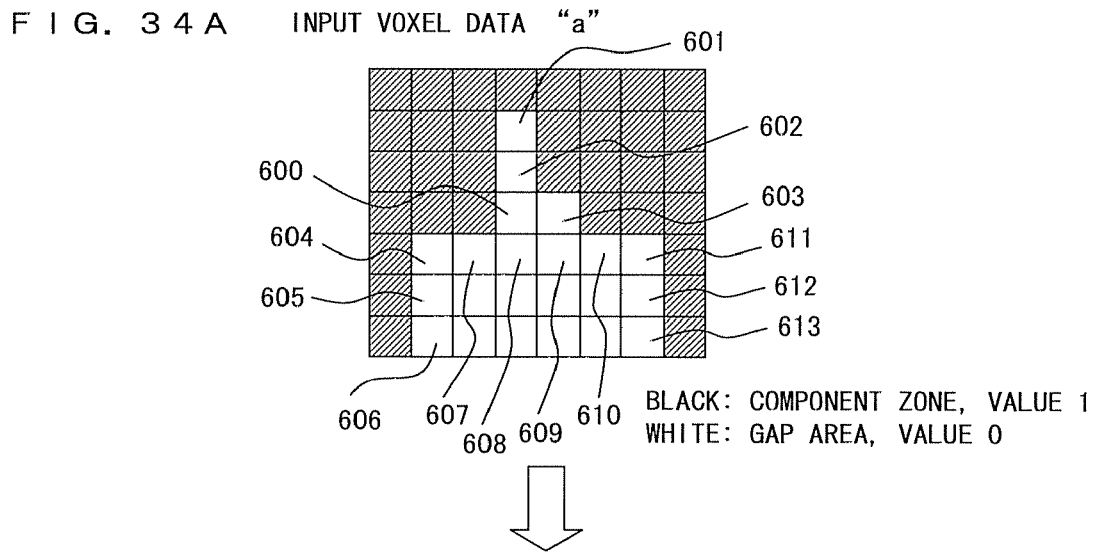
FIG. 34A INPUT VOXEL DATA "a"
BLACK: COMPONENT ZONE, VALUE 1
WHITE: GAP AREA, VALUE 0
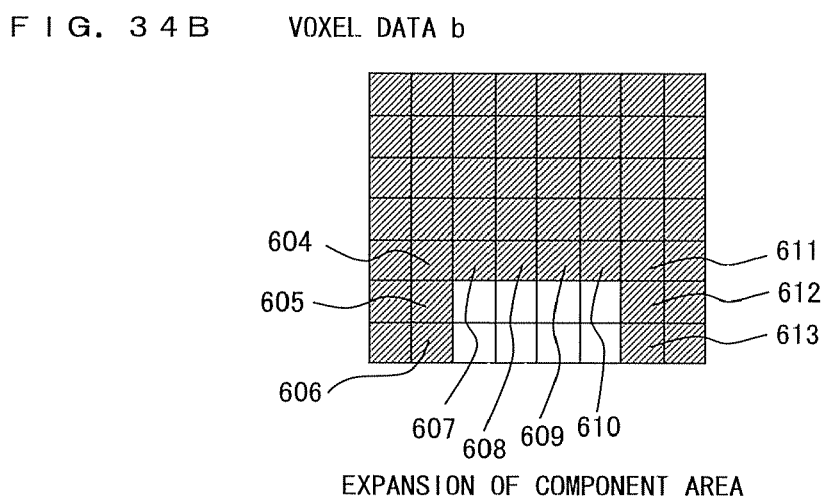
FIG. 34B VOXEL DATA b
EXPANSION OF COMPONENT AREA
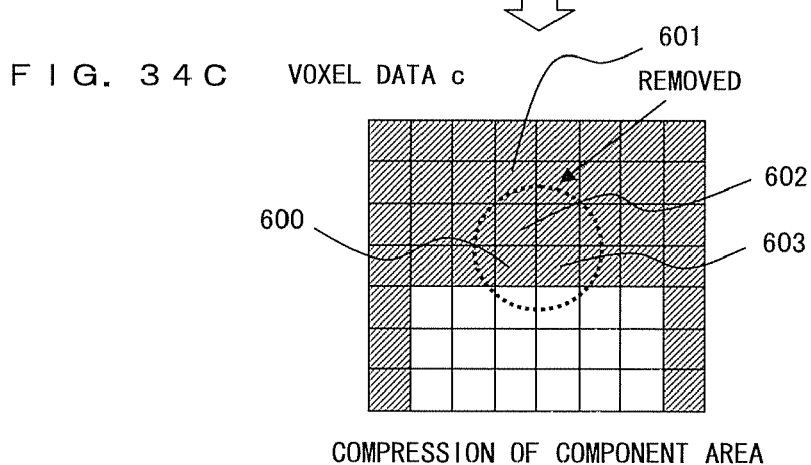
FIG. 34C VOXEL DATA c
COMPRESSION OF COMPONENT AREA

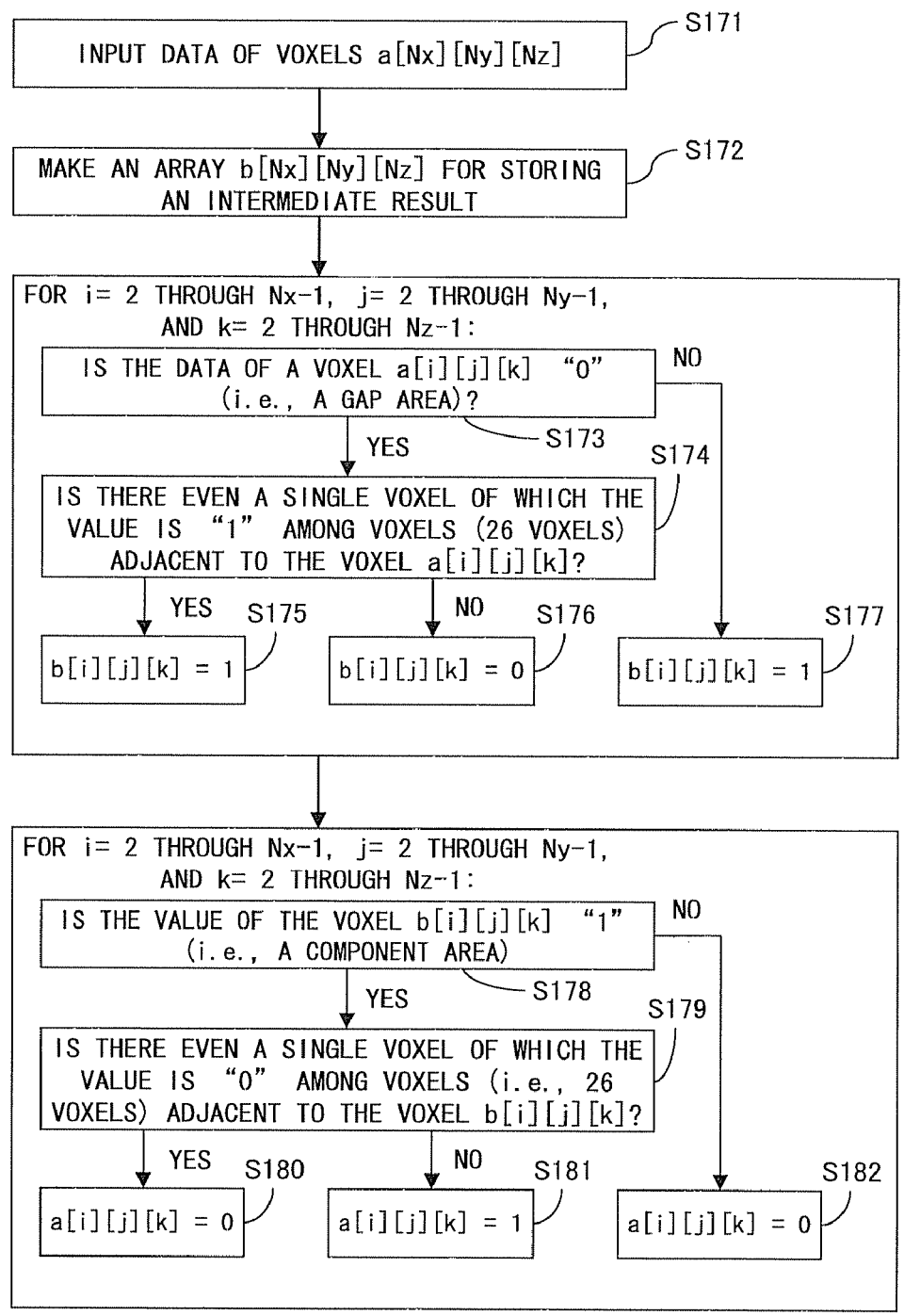
F I G. 3 5

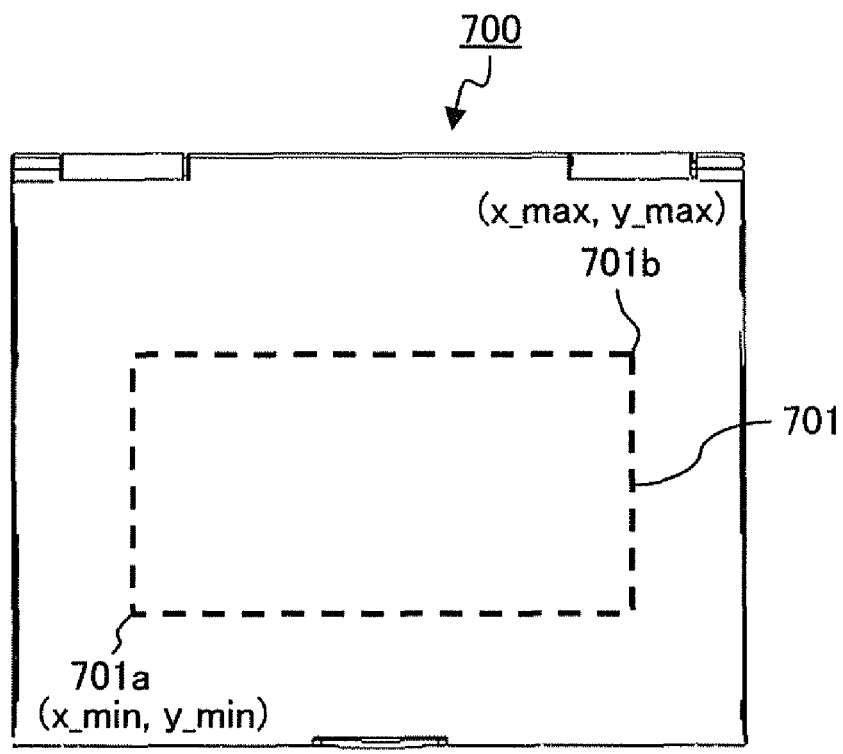
TOP VIEW
F I G. 3 6 A
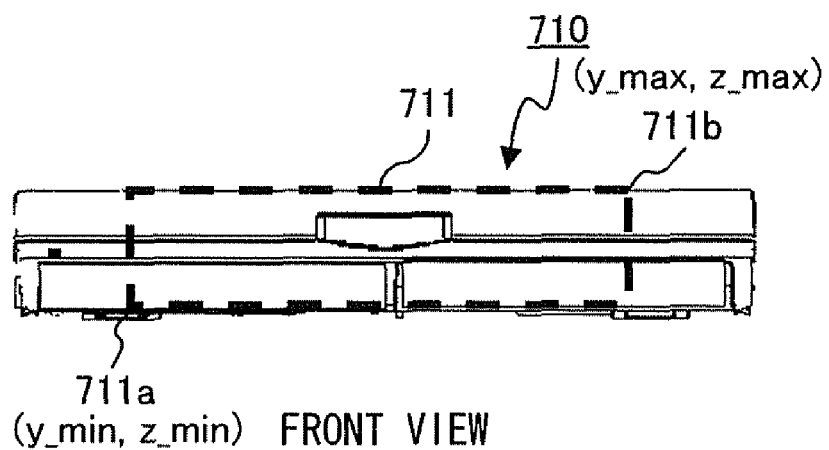
FRONT VIEW
F I G. 3 6 B

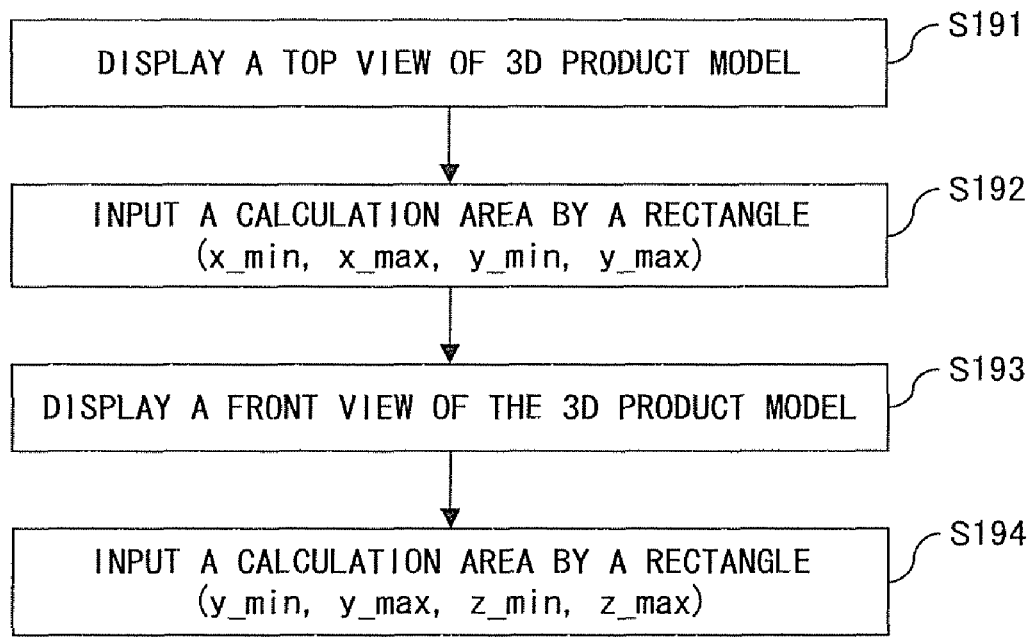
F I G. 3 7

IMAGE PROCESS APPARATUS FOR THREE-DIMENSIONAL MODEL

BACKGROUND OF THE INVENTION

1. Field of the Invention

The present invention relates to an image process for a three-dimensional model, and in particular to an image process apparatus relating to a three-dimensional model of a gap space inside of a product.

2. Description of the Related Art

Ever increasing demand is a light weight and compact product for small electronic equipments including lap top personal computers (PC), personal digital assistants (PDA), portable phones, portable music players, et cetera. The product designs of these electronic equipments are carried out by computer aided designs (CAD). A high density mounting of component is a compulsory requirement for making a product compact, which accordingly requires a minimization of a gap in the inside of the product.

A conventional technique for visualizing a gap inside of a product is a method for displaying a cross-sectional image of a three-dimensional (simply "3D" hereinafter) model. And a technique for measuring a gap volume of the inside of a product is a mechanical 3D CAD comprising such a measurement function. The 3D CAD, comprising a product sum arithmetic operation function of a 3D model, is capable of calculating a volume of a gap space of the inside of a product by subtracting the volumes of all components from the volume of the entirety of the product.

Incidentally, techniques related to the present invention include an apparatus (refer to a Japanese registered patent No. 3265879) generating 3D grid data by using voxel data and a method (refer to a Laid-Open Japanese Patent Application Publication No. 2000-24754) for determining a casting dimensional model by comprehending an initial cross-sectional model possessing a substance area and a gap area in a solid layout model. And a known method for a high speed generation of a 3D model using voxel data is a Marching Cubes method (refer to U.S. Pat. Nos. 4,885,688 and 4,710,876).

The above noted display method for a cross-sectional image of a 3D model has only been capable of visualizing a gap in two-dimension, thus making it difficult to comprehend a gap inside of a product correctly. A volume calculation of a gap space by the above noted 3D CAD requires a generation of a model of the entirety of a product, causing a large load of the generation work and needing to spend a large number of work hours. Mean while, the 3D CAD has been faced with a need of a tremendous length of time for a volume calculation of gap spaces because of expressing a 3D feature by a solid model.

SUMMARY OF THE INVENTION

A purpose of the present invention is to accomplish a capability of visualizing a gap space of the inside of a product in three-dimension (3D). Another purpose of the present invention is to accomplish a high speed generation of a 3D model of a gap space of the inside of a product. Yet another purpose of the present invention is to accomplish a capability of calculating a volume of a gap space of the inside of a product at high speed.

A first aspect of an image process apparatus for a 3D model of the present invention comprises a cross-sectional image cutout unit, a cross-sectional image process unit, a three-dimensional grid data generation unit and a three-dimensional model generation unit.

The cross-sectional image cutout unit cuts out a plurality of cross-sectional images from surface data of a 3D model of a product. The cross-sectional image process unit separates a cross-sectional image that is cut out by the cross-sectional image cutout unit into a component area and a gap area. The three-dimensional grid data generation unit generates 3D grid data by layering cross-sectional images obtained by the cross-sectional image process unit. The three-dimensional model generation unit generates a 3D model of a gap space of the inside of the product based on 3D grid data generated by the three-dimensional grid data generation unit.

The first aspect of the image process apparatus for a 3D model according to the present invention is configured to generate a 3D model of a gap space of a product from surface data of a 3D model of the product, there by enabling a visualization of the 3D model of the gap space and also a high speed generation of the 3D model.

A second aspect of the image process apparatus for a 3D model of the present invention, according to the aforementioned first aspect, is configured in a manner that the cross-sectional image process unit calculates a convex hull structure of the cross-sectional images and extracts a gap area from the inside of the convex hull based on the calculation result.

The second aspect of the image process apparatus for a 3D model according to the present invention is configured to utilize a convex hull structure, thereby enabling a correct extraction of a gap space inside of a product by distinguishing between the interior and exterior of the product.

A third aspect of the image process apparatus for a 3D model of the present invention, according to the abovementioned first aspect, is configured to further comprise a partial specification unit for specifying a part of a product, wherein the cross-sectional image cutout unit cuts out only a cross-sectional image of a part specified by the partial specification unit, and the cross-sectional image process unit, three-dimensional grid data generation unit and three-dimensional model generation unit apply the respective processes to a cross-sectional image cut out by the cross-sectional image cutout unit.

The third aspect of the image process apparatus for a 3D model of the present invention enables a visualization of a 3D model of a gap space in a desired part of the inside of a product, and a high speed generation of the 3D model, from a surface data of the 3D model of the product.

A fourth aspect of an image process apparatus for a 3D model of the present invention comprises a cross-sectional image cutout unit, a cross-sectional image process unit, a three-dimensional grid data generation unit and a volume calculation unit.

The cross-sectional image cutout unit cuts out a plurality of cross-sectional images from surface data of a 3D model of a product. The cross-sectional image process unit separates a cross-sectional image that is cut out by the cross-sectional image cutout unit into a component area and a gap area. The three-dimensional grid data generation unit generates 3D grid data by layering cross-sectional images obtained by the cross-sectional image process unit. The volume calculation unit calculates a volume of a gap space of the inside of the product based on the 3D grid data generated by the three-dimensional grid data generation unit.

The fourth aspect of the present invention enables a high speed calculation of a volume of a gap space of the inside of a product based on surface data of a 3D model of the product.

A fifth aspect of the image process apparatus for a 3D model of the present invention, according to the abovementioned fourth aspect, is configured in a manner that the cross-sectional image process unit calculates a convex hull structure of the cross-sectional images and extracts a gap area from the inside of the convex hull based on the calculation result.

The fifth aspect of the present invention is configured to utilize a convex hull structure, thereby enabling an accurate calculation of a volume of a gap space of the inside of a product by definitely distinguishing between the product interior and exterior.

A sixth aspect of the image process apparatus for a 3D model of the present invention, according to the abovementioned fourth aspect, is configured to further comprise a partial specification unit for specifying a part of the product, wherein the cross-sectional image cutout unit cuts out only a cross-sectional image of a part specified by the partial specification unit, and the cross-sectional image process unit, three-dimensional grid data generation unit and volume calculation unit apply processes of the respective units to the cross-sectional image cut out by the cross-sectional image cutout unit.

The sixth aspect of the present invention enables a high speed calculation of a volume of a gap space of a desired part of the inside of a product.

A seventh aspect of an image process apparatus for a 3D model of the present invention comprises a cross-sectional image cutout unit, a cross-sectional image process unit, a three-dimensional grid data generation unit, a three-dimensional model generation unit and a volume calculation unit. The cross-sectional image cutout unit cuts out a plurality of cross-sectional images from surface data of a 3D model of a product. The cross-sectional image process unit separates a cross-sectional image that is cut out by the cross-sectional image cutout unit into a component area and a gap area. The three-dimensional grid data generation unit generates 3D grid data by layering cross-sectional images obtained by the cross-sectional image process unit. The three-dimensional model generation unit generates a 3D model of a gap space of the inside of a product based on 3D grid data generated by the three-dimensional grid data generation unit. The volume calculation unit calculates a volume of a gap space of the inside of the product based on the 3D grid data generated by the three-dimensional grid data generation unit.

The seventh aspect of the image process apparatus for a 3D model of the present invention enables a visualization of a 3D model of a gap space of the inside of a product, and a high speed generation of the 3D model, from a surface data of the 3D model of the product. It further enables a high speed calculation of a volume of a gap space in the inside of the product.

The present invention is contrived to generate cross-sectional images from surface data of a 3D model of a product and separate each of the cross-sectional images into a gap area and a component area, followed by layering each cross-sectional image to generate 3D grid data and a 3D model of a gap area of the inside of the product; and also calculate a volume of the gap area of the inside of the product based on the 3D grid data.

Therefore, the present invention enables a high speed generation of a 3D model of a gap space of the inside of a product and a three-dimensional visualization of the gap space; and also enables a high speed calculation of a volume of the gap space of the inside of the product.

BRIEF DESCRIPTION OF THE DRAWINGS

FIGS. 1A through 1D are illustration diagrams showing the principle of the present invention; FIG. 1A is an overhead view diagram of the entirety of a 3D product model looked from diagonally overhead; FIG. 1B is a diagram showing a method for cutting out the product model in layers by using perpendicular cutting planes; FIG. 1C is a diagram showing one of cross-sectional images cut out by the cutting plane; FIG. 1D is a diagram showing divisions of the cross-sectional image of a grid form and an expression of individual grids by black and white pixels.

FIGS. 2A through 2D are diagrams describing an outline of an embodiment of the present invention; FIG. 2A is a diagram showing a 3D product model as a target of generation and calculation of a gap area, and a method for setting a calculation area (i.e., a part indicated by the dotted lines) surrounding the entirety of the 3D product model; FIG. 2B is a diagram showing a method for setting a plurality of cutting planes for the calculation area; FIG. 2C is a diagram showing cross-sectional images cut out by the cutting planes; FIG. 2D is a diagram showing voxel data generated by layering the plurality of cross-sectional images.

FIG. 4 is a diagram showing a software configuration according to the present embodiment.

FIG. 5 is a flow chart showing an overall process procedure of a 3D model generation and volume calculation processes of a gap area of a product model according to the present embodiment.

FIG. 6 is a diagram showing a feature of a calculation area according to the present embodiment.

FIG. 8 is a diagram exemplifying 3D component surface data defined by six pieces of polygon data.

FIG. 12 is a flow chart showing a detail of a process for calculating surface data of a gap area based on voxel data.

FIG. 16 is a flow chart showing a detail of a process for calculating a volume of a 3D model of a gap area based on voxel data.

FIGS. 17A and 17B are diagrams exemplifying a structure of a database for searching a volume of a cell from a pattern of voxel values of eight apexes of the cell.

FIGS. 19A through 19G are diagrams describing the processes of the flow chart shown in FIG. 18.

FIGS. 22A through 22F are diagrams describing a process of forming a single cuboid by combining cells in the x direction.

FIG. 23A through 23F are diagrams describing a process of forming a single cube by combining cells in the y direction.

FIG. 24 is a diagram showing a cuboid after recombining combined cells.

FIG. 26A is a diagram showing a size of a calculation area.

FIG. 26B is a diagram showing a size of a voxel.

FIG. 26C is a diagram showing voxel data with a coarse resolution.

FIG. 26D is a diagram showing voxel data with a fine resolution.

FIGS. 34A through 34C are diagrams showing an example method for removing a voxel in a minute gap area surrounded by a calculation area.

FIG. 35 is a flow chart showing an algorithm of a voxel removal method within a minute gap area.

FIGS. 36A and 36B are diagrams showing a method for partially specifying a calculation area of a product model.

FIG. 37 is a flow chart showing an algorithm of a method for partially specifying calculation area of a divided area.

DESCRIPTION OF THE PREFERRED EMBODIMENTS

Figure 3:
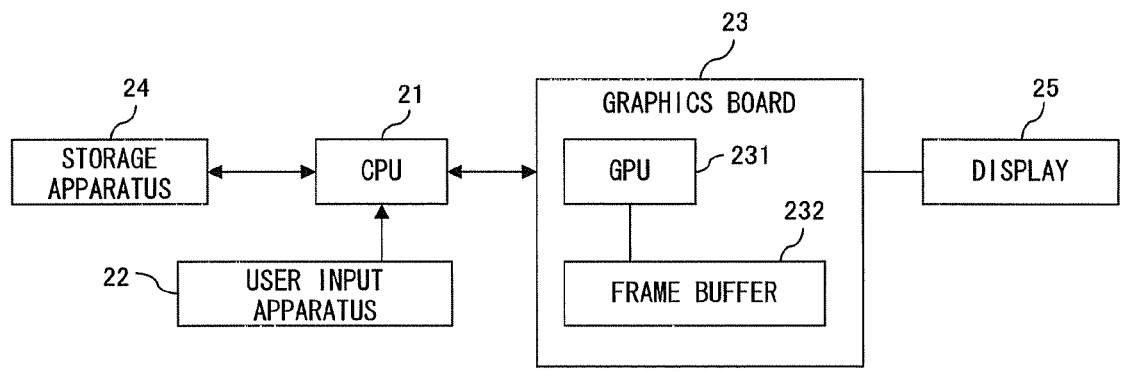
FIG. 3 is a diagram showing a system configuration of hardware according to the present embodiment.

The following is a description of the present invention by referring to the accompanying drawings.

[The Principle of the Present Invention]

The present invention is contrived to express a component feature by a grid structure in a 3D space including a 3D model. And it is contrived to express a form of a 3D model by a surface model, separate surface data of the 3D model into a grid of the inside of the component and that of the outside thereof, and extract a grid of the outside of the component as that of a gap space (i.e., a gap area).

Thus expressing a gap space by a grid structure makes it possible to speed up a generation of a 3D model of a product and a calculation of a volume thereof.

For example, a use of an orthogonal grid as a grid, a 3D structure becomes voxel data, making it possible to generate a 3D model from a surface voxel. The generation can utilize a known high speed 3D model generation method, such as a marching cubes method, et cetera. It is also possible to calculate a volume of a product by counting the number of voxels in a gap space.

Adjusting a resolution of voxel data makes it possible to carry out a modeling of a product and a volume calculation thereof with a variable accuracy. That is, when desiring to examine the entirety of the product coarsely, a volume calculation is performed by lowering a resolution (i.e., by enlarging a voxel size). Conversely, when desiring to examine the entirety of the product finely the volume calculation is performed by raising the resolution (i.e., by reducing a voxel size). It is possible to carry out a volume calculation effectively by changing a degree of coarseness or fineness of a product examination according to the model form. That is, it is possible to decrease the number of voxels while maintaining a precision by expressing a part of the product having a simple surface feature by coarse voxels while a part thereof having a complex surface feature by fine voxels.

An available method as one of the simplest method for generating voxel data in high speed is, for example, one for judging whether each grid is either the exterior or interior of a product based on surface data of a component model. This method, however, causes an increase in process cost greatly with the number of components or grids.

The present invention is contrived to cut out a cross-section of a 3D model and draw the inside of a component by painting it over in the cross-sectional indication, thereby easily extracting a gap part from the cross-sectional image, followed by structuring voxel data of the gap part by layering the extracted gap images. The generation of the cross-sectional image can utilize graphics hardware, enabling a high speed process.

FIG. 1 is an illustration diagram showing the principle of the present invention.

FIG. 1A is an overhead view diagram of the entirety of a product model 1 looked from diagonally overhead.

The product model 1 is cut out in a plurality of layers by using vertical cutting planes 2 shown in FIG. 1B. FIG. 1C is a diagram showing one of cross-sectional images 3 cut out by the cutting plane 2. Referring to the cross-sectional image 3, the black painting part indicates a component area, while the white part indicates a gap part.

Then, the cross-sectional image 3 is divided into grids as shown in FIG. 1D, expressing individual grids by black and white pixels, respectively. Referring to FIG. 1D, the grid "1" is a black pixel, while the grid "0" is a white pixel. This example partitions the cross-sectional image 3 by vertical 8 grids by horizontal 8 grids, that is, 64 grids. A gap area in a cross-sectional image 3 can be extracted by determining a connection area of white pixels, that is, the grids "0".

The above description exemplifies the case of the cross-sectional image being a black and white image, while the case of a color image may be expressed by pixel values of red, green and blue, respectively.

Preferred Embodiment

{Outline}

FIG. 2 is a diagram describing an outline of a preferred embodiment ("the present embodiment" hereinafter) of the present invention.

FIG. 2 gives a lap top PC as an example of a 3D product model.

As shown FIG. 2A, the present embodiment designates, for a 3D product model 11 as the target of a generation and volume calculation of a gap area, a calculation area 12 (a part indicated by the dotted lines) surrounding the entirety of the 3D product model 11. Then, it designates a plurality of cutting planes 13 for the calculation area 12 and cuts out the calculation area 12 by a plurality of cutting planes 13 as shown in FIG. 2B. Then, it generates an image on a crossing plane between the calculation area 12 and each cutting plane 13, which is obtained by the cutout, as a cross-sectional image 14 as shown in FIG. 2C. It then generates voxel data 15 by layering a plurality of cross-sectional images 14 as shown in FIG. 2D. The voxel data 15 is generated by a marching cubes method for example.

The present embodiment is configured to generate surface data of a gap area of the 3D product model 11 by a later described method based on the above noted voxel data 15 and moreover calculates a volume of the gap area.

{System Configuration}

FIG. 3 is a diagram showing a system configuration of hardware according to the present embodiment.

The present embodiment comprises a CPU 21, a user input apparatus 22, a graphics board 23, a storage apparatus 24 and a display 25.

The storage apparatus 24 is a storage, being constituted by a hard disk drive (HDD) apparatus or optical disk apparatus, and further by an external storage apparatus such as a portable storage media drive apparatus for a CD or DVD. The storage apparatus 24 stores software including firmware such as BIOS (i.e., a basic input/output system), basic software (i.e., an operation system (OS)), drivers for peripheral apparatuses and furthermore a program according to the present embodiment, which describes the procedures for a generation of a gap area of a product model and a volume calculation of the gap area.

The CPU 21 executes the above noted software stored in the storage apparatus 24 for controlling the entirety of a system, and carrying out a user input process, a screen display process, generation of a 3D model, a volume calculation thereof, et cetera. The CPU 21 comprises memory therein, incidentally.

The user input apparatus 22 is constituted by pointing devices, et cetera, including key board, mouse, et cetera. A user using the present embodiment starts up a system of the present embodiment by way of the user input apparatus 22, performs a designation of various kinds of data, a command input, et cetera.

The graphics board 23, comprising a graphics processor unit (GPU) 231 and a frame buffer 232, performs a drawing process of image data for displaying in the display 25. The GPU 231 is a processor dedicated to the drawing process. The frame buffer 232 is a memory for storing display data generated by the GPU 231 for the display 25. The frame buffer 232 stores graphics data to be displayed in the display 25 by a bit map format for example.

The display 25, comprising a thin display apparatus such as CRT and LCD, displays image data sent from the GPU 231 in a display screen. The present embodiment is configured to display a 3D model and a cross-sectional image thereof, et cetera.

{Software Configuration}

FIG. 4 is a diagram showing a software configuration according to the present embodiment comprising the above described hardware configuration.

The software configuration of the present embodiment is largely categorized into an input function 30, a calculation function 40 and an output function 50 in terms of function. The input function 30 is constituted by a surface data input unit 31 and a calculation condition input unit 32. The calculation function 40 is constituted by a cross-sectional image calculation unit 41, a voxel calculation unit 42, a surface data calculation unit 43 and a volume calculation unit 44. The output function 50 is constituted by a data storage unit 51 and a drawing display unit 52.

The input function 30 is implemented by the user input apparatus 22 and by the CPU 21 executing a program. The calculation function 40 is implemented by the storage apparatus 24 and by the CPU 21 executing the program. The output function 50 is implemented by the CPU 21 executing the program and by the graphics board 23.

The surface data input unit 31 inputs surface data of components structuring a 3D model of a product (simply a "product model" hereinafter) The calculation condition input unit 32 inputs a condition necessary for calculating a volume of the product model.

The cross-sectional image calculation unit 41 calculates (i.e., draws) a cross-sectional image of the product model. The voxel calculation unit 42 generates voxel data by layering cross-sectional images obtained by the cross-sectional image calculation unit 41. The surface data calculation unit 43 calculates (i.e., generates) surface data of a 3D model of a gap area of the product model based on the voxel data. The volume calculation unit 44 calculates a volume of the gap area of the product model based on the voxel data.

The data storage unit 51 stores data generated by the cross-sectional image calculation unit 41, voxel calculation unit 42, surface data calculation unit 43 and volume calculation unit 44. The drawing display unit 52 reads cross-sectional image data, surface data of a gap area and a volume calculation result thereof from the data storage unit 51, and displays a cross-sectional image of the product model, a 3D model image of a gap area of the product and a volume of the gap area in the display 25.

{Overall Process Procedure}

FIG. 5 is a flow chart showing an overall process procedure of a 3D model generation and volume calculation processes of a gap area of a product model according to the present embodiment.

The first process is to input surface data of each component constituting a product model by way of the user input apparatus 22 (S1), followed by inputting a calculation area (i.e., a bounding box) of the product model and a resolution of the calculation area by way of the user input apparatus 22 (S2). The calculation area is an area as the target of calculation of a product model as described above. The resolution is a threshold value of the minimum gap to be detected. The inputs in the steps S1 and S2 are performed by way of the user input apparatus 22.

The present embodiment is configured to specify a cuboid 60 as shown in FIG. 6 as a calculation area. The cuboid (i.e., the calculation area) 60 is specified by a 3D coordinate system (x, y, z) consisting of mutually perpendicular x-, y-, and z-axes as shown on the left bottom of FIG. 6. The origin of the 3D coordinate system is set at an apex that is positioned at the bottom left corner of the cuboid 60.

The next is to calculate a voxel size and the number of voxels in the calculation area (S3).

Figure 7:
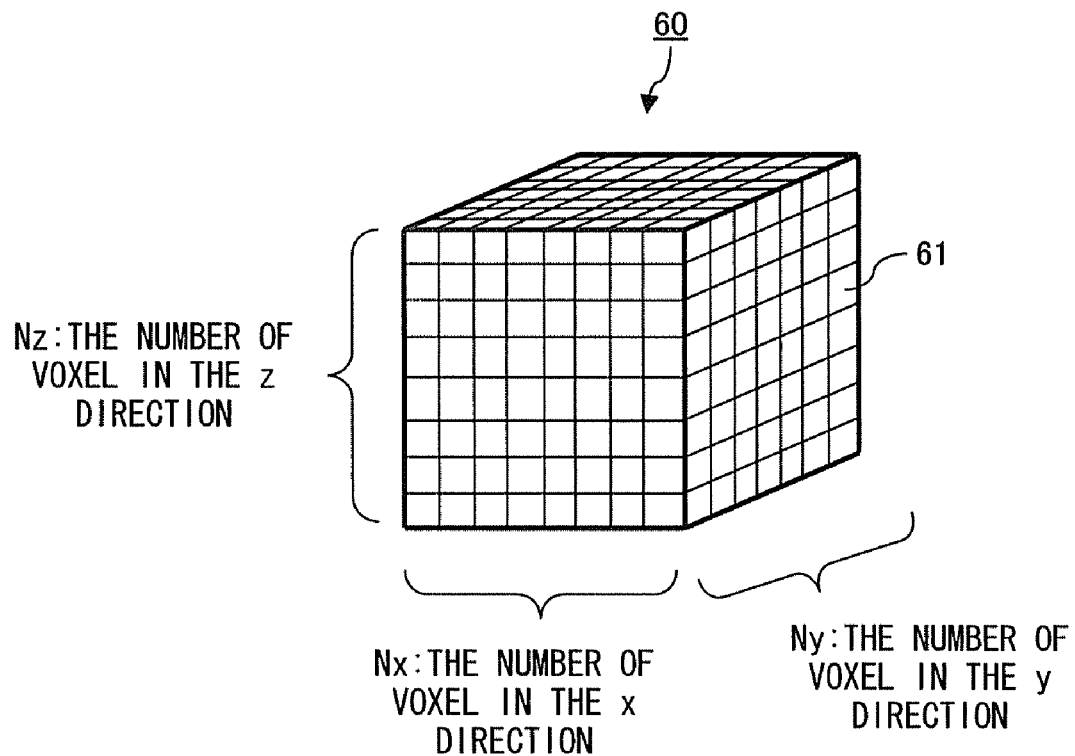
FIG. 7 is a diagram showing the numbers of voxels in the x, y and z directions of a calculation area according to the present embodiment.

A voxel size is a size of one voxel, corresponding to the aforementioned resolution. The number of voxels is the number thereof within the calculation area. The step S3 divides the calculation area 60 by the voxels 61 based on the calculation area and resolution which have been input in the step S2, and calculates the numbers of voxels Nx, Ny and Nz in the x, y and z directions, respectively, as shown in FIG. 7.

Subsequent step is to make an array a [Nx][Ny][Nz] of the voxel data obtained by the step S3 (S4), followed by calculating a value of each voxel data (i.e., a voxel value) (S5). The calculation method for the voxel value is described later. The present embodiment is configured in a manner that a voxel value is binary data, i.e., either "1" or "0", with the voxel data within a component area being set to "1" and the one in a gap area being set to "0".

Then the process calculates surface data of a 3D model of a gap area from the voxel data based on the voxel value obtained in the step S5 (S6). A detail of a calculation method for the surface data is also described later. It calculates a volume of the 3D model of a gap area based on the voxel data. A calculation method for a volume of the gap area is also described later.

The processes of the steps S3 through S5 in the flow chart shown by FIG. 5 are carried out by the CPU 21 executing a program, which is stored in the storage apparatus 24, according to the present embodiment. Also the input data process of the steps S1 and S2 is carried out by the CPU 21 executing the afore mentioned program.

As such, the present embodiment is configured to generate grid data of a 3D model of a product from surface data of the 3D model of the product, followed by generating a 3D model of a gap space of the product and calculating a volume of the gap space based on the 3D grid data. It is therefore possible to carry out a generation of a 3D model, and a volume calculation, of the gap space at high speed. It is also possible to display a gap space visually and three-dimensionally by displaying the 3D model of the gap space in the display 25.

{Component Surface Data}

Surface data (i.e., component surface data i (where i=1, 2, through n)) of individual components i which are to be input in the step S1 shown in FIG. 5 is constituted by parameters including "component name", "component coordinates", "aggregation of polygon data", et cetera, as shown in the following:

<Component Surface Data 1>
Component name
Component coordinates (i.e., the position and attitude of component coordinate relative to the world coordinates)
Position: double Pc[3], attitude: double Rc[3], [3]
Aggregation of polygon data
The polygon data is one indicating a position (i.e., a position relative to a component coordinates) of three apexes of a triangle polygon. The polygon data is specified by the following format:
Position: double Pv0[3], double Pv1[3], double Pv2[3]
<Component Surface Data 2>

FIG. 8 exemplifies 3D component surface data 70 defined by six pieces of polygon data 71.

{Voxel Data Expression}

Figure 9:
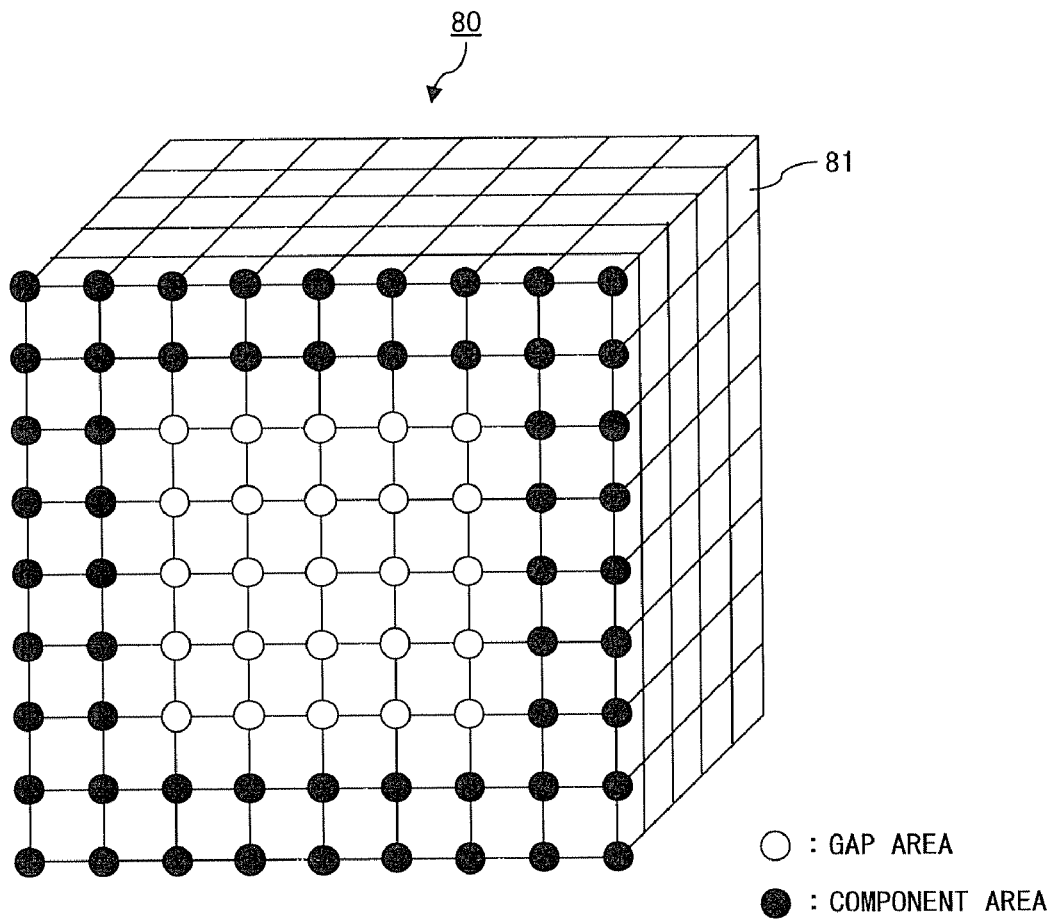
FIG. 9 is a diagram showing a method for expressing, by voxel data, a 3D model of a gap space (i.e., a gap area) of a product model within a calculation area.

FIG. 9 is a diagram showing a method for expressing, by voxel data, a 3D model of a gap space (i.e., a gap area) of a product model within a calculation area.

The calculation area 80 shown by FIG. 9 is divided into 320 (i.e., 5*8*8) pieces of voxels 81. In the showing of FIG. 9, the apexes of individual voxels are indicated by "○" (for gap area) and "●" (for component area) according to whether they belong to a gap area or a component area.

{Expression of a Degree of Complexity of a Surface by Voxels}

Figure 10:
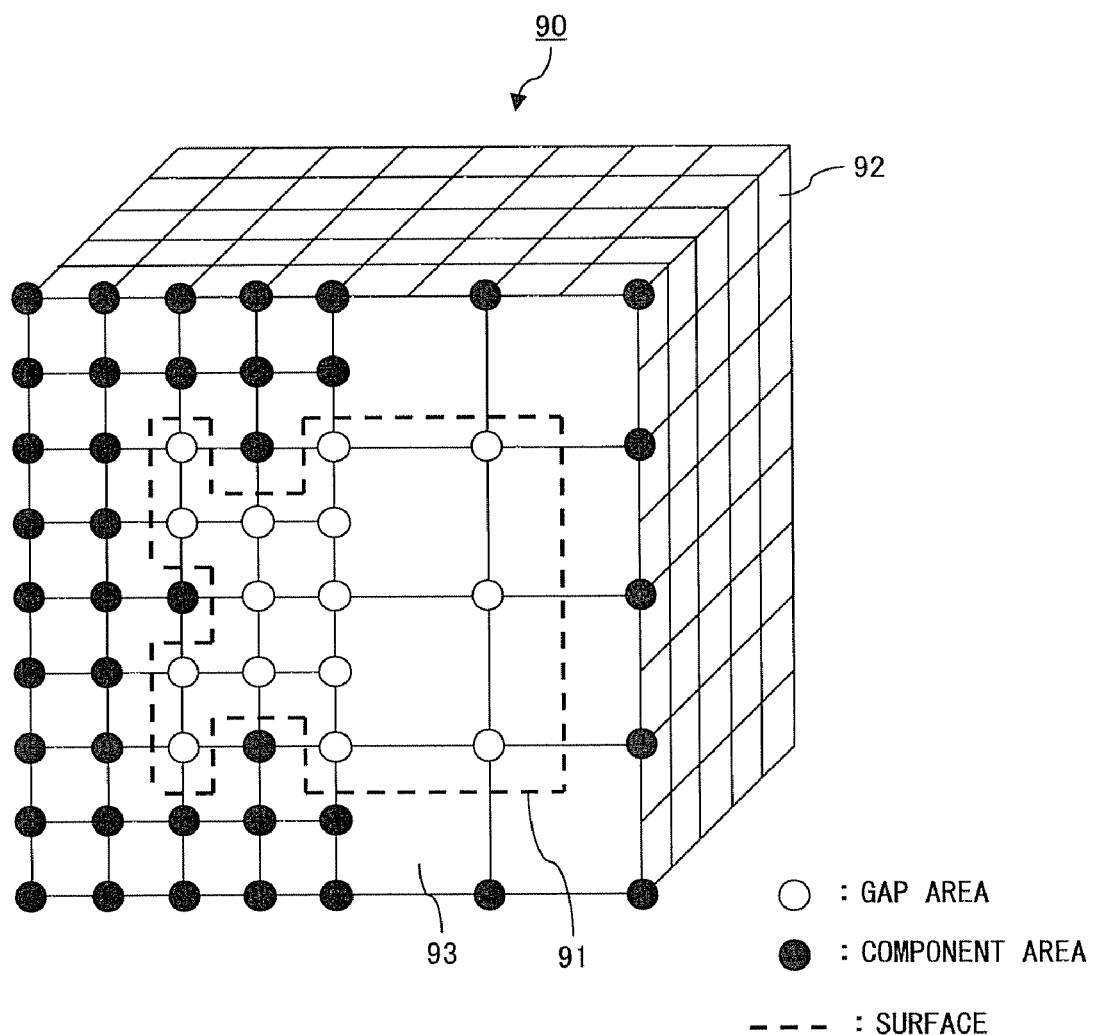
FIG. 10 is a diagram expressing a complexity of a surface feature by a coarse/fine array of voxels.

FIG. 10 is a diagram expressing a complexity of a surface feature by a coarse/fine array of voxels.

Referring to the calculation area 90 shown by FIG. 10, the part surrounded by the dotted lines is surface data 91 of a gap space (i.e., a gap area). The surface data 91 has a simple feature on the right half of the drawing, and a complex feature with irregularities on the left half. In such a case, the right half is expressed by a large voxel 93 integrating four voxels 92, while the left half is expressed by voxels 92 of a specified resolution. Such expression enables the right half of the surface data 91 of a gap space to be expressed by eight pieces of voxel data, while the left half to be expressed by fifteen pieces of voxel data (i.e., twelve pieces of voxel data indicating a gap area and three pieces of voxel data indicating a component area).

As described above, a part with a complex feature is expressed by voxels of a specified resolution and a part with a simple feature is expressed by large voxels, which have integrated voxels of the specified resolution, in the case of expressing a surface, thereby making it possible to reduce the number of pieces of voxel data used for calculating a volume of a gap area.

{Details of Voxel Value Calculation Process}

Figure 11:
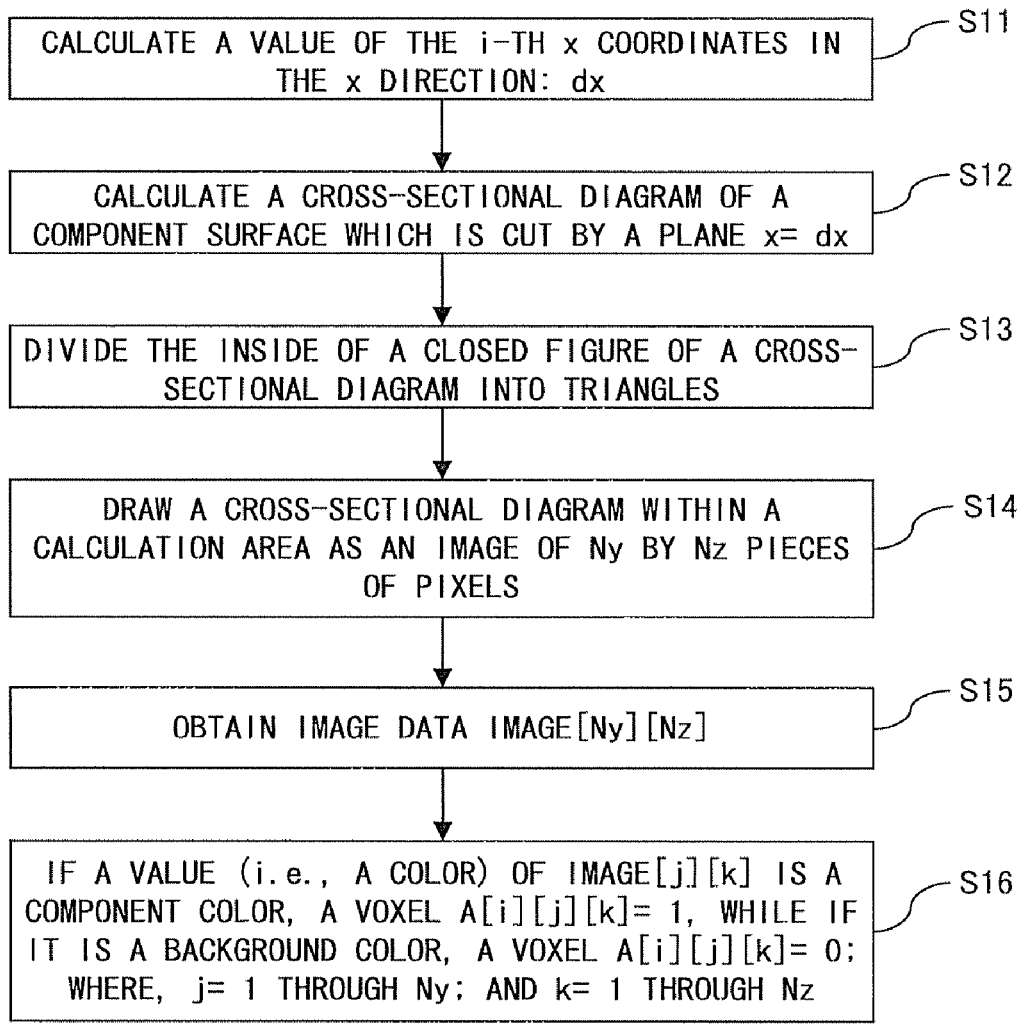
FIG. 11 is a flow chart showing a detail of a voxel value calculation process.

FIG. 11 is a flow chart showing a detail of the voxel value calculation process in the step S5 shown in FIG. 5.

The present embodiment is configured to divide a calculation area into Nx pieces in the x direction. Therefore, the width dx in the x direction of a voxel is:

$$dx = i*Wx/Nx + x\_min \quad (1);$$

where:
i: an index in the x direction;
Wx: an x direction width of a calculation area; and
x_min: the minimum value of a calculation area in the x direction.

The present embodiment is configured to carry out a process of the flow chart shown by FIG. 11 for i=1 through Nx.

The process first calculates the i-th x coordinate value dx in the x direction by the above noted expression (1) (S11), followed by calculating a cross-sectional diagram of which a component surface is cut by a plane (i.e., a cutting plane) of x=dx (S12).

The step S12 calculates the intersection between each of triangles and the cutting plane because a component surface is an aggregation of triangle polygon data (refer to FIG. 8).

Then the process divides the inside of a closed figure of a cross-sectional diagram obtained by the step S12 (S13) into the triangles.

Connecting the intersection line segments obtained by the step S12 forms a closed figure (i.e., a polygon), and it is accordingly divided into triangles. This process is performed because the triangles are necessary for drawing the surface data.

Then the process draws a cross-sectional diagram within the calculation area as an image constituted by Ny multiplied by Nz pieces of pixels (S14).

The drawing in the step S14 is carried out by the GPU 231, and the drawn data is stored by the frame buffer 232. The internal memory is used in the case of the CPU calculating the drawing process. This drawing process sets a pixel of the inside of a component to "1" (i.e., black) and a pixel of a background (i.e., a gap area) to "0".

Then the process obtains image data Image [Ny][Nz] of the cross-sectional diagram (S15).

Here, the Image[Ny][Nz] is a two-dimensional array expressing pixels of image data of the cross-sectional diagram. A cross-sectional diagram is divided into Ny by Nz pieces of pixels.

If a value of Image [j][k] is a component color (i.e., "1"), the process sets it as a voxel a[i][j][k]=1, while if it is a background color (i.e., "0"), the process sets it as a voxel a [i][j][k]=0 (S16). Here, the j and k (where, j=1 through Ny; and k=1 through Nz) are indices in the y- and z-directions, respectively.

{Surface Data Calculation of a Gap Area based on Voxel Data}

FIG. 12 is a flow chart showing a detail of the process of the step S6 shown in FIG. 5.

The process of the flow chart shown by FIG. 12 is carried out for i=1 through Nx−1, j=1 through Ny−1, and k=1 through Nz−1.

Figure 13:
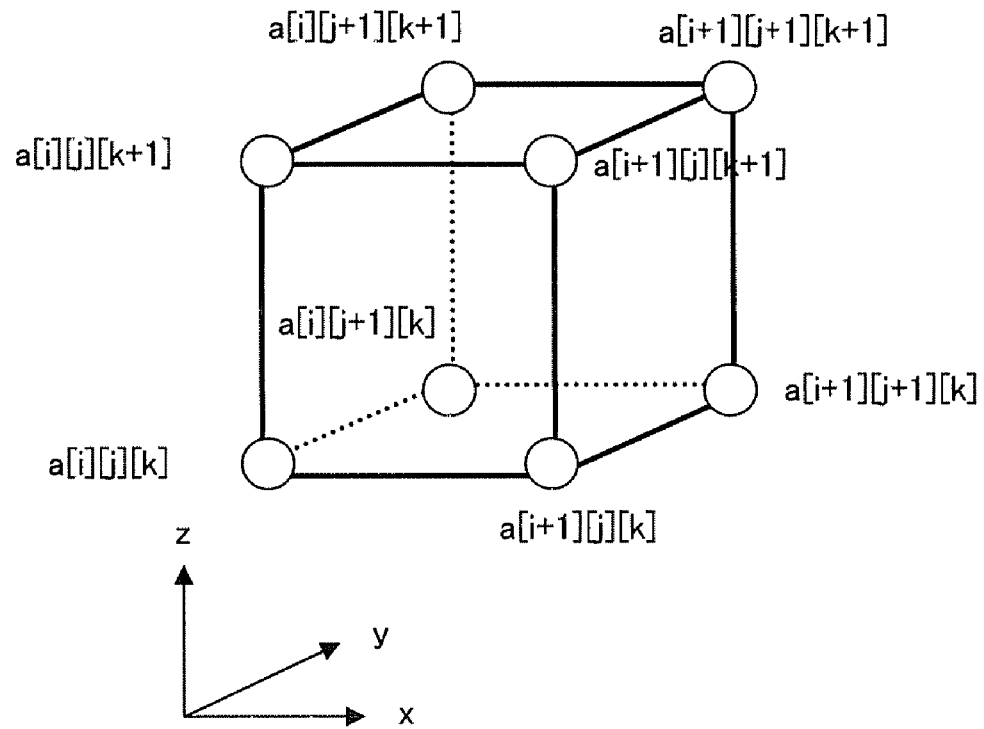
FIG. 13 is a diagram showing a structure of a cuboid (i.e., a cell) constituted by the respective centers of eight voxels as its apexes.

It structures a cuboid (i.e., a cell) with its apexes being the respective centers of eight voxels, i.e., a[i][j][k], a [i][j][k+1], a[i][j+1][k], a[i][j+1][k+1], a[i+1][j][k], a[i+1][j][k+1], a[i+1][j+1][k] and a[i+1][j+1][k+1] (S21). FIG. 13 shows the structure of the aforementioned cell.

Figure 14:
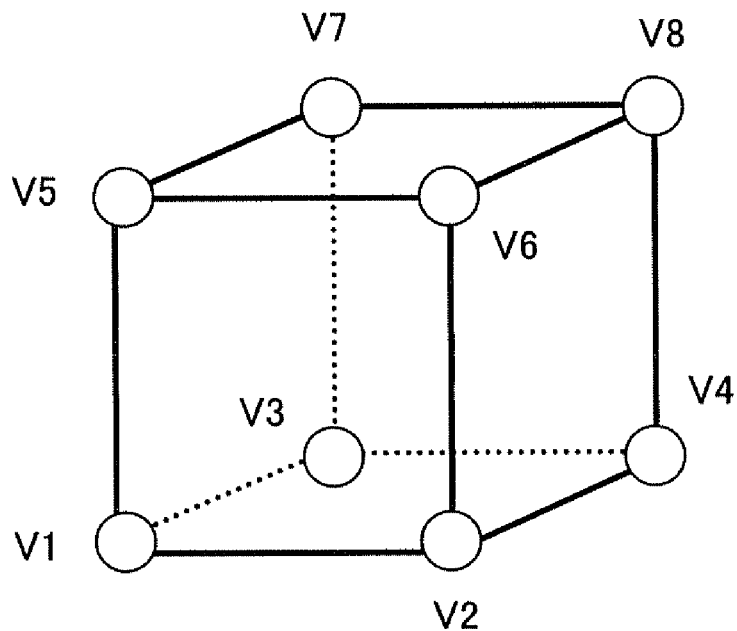
FIG. 14 is a diagram showing eight apexes of a cell.

Then it obtains voxel values Cm (where m=1 through 8) of eight apexes Vm of the cell (S22). FIG. 14 shows the apexes V1 through V8 of a cell.

Then the process searches, and obtains, a triangle pattern corresponding to a combination of {C1, C2 through C8} by using the marching cubes method, et cetera (S23).

Figures 15A, 15B, 15C, 15D, 15E:
FIGS. 15A through 15O are the diagrams showing a part of registered triangle patterns.
Figures 15F, 15G, 15H, 15I, 15J:
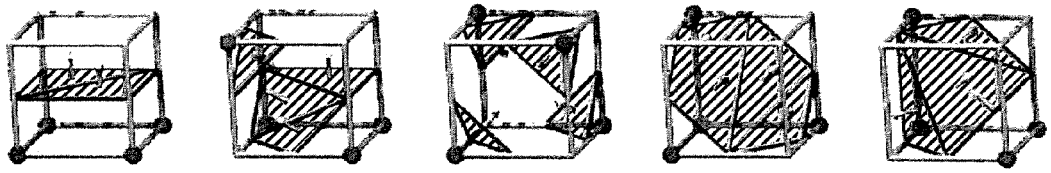
Figures 15K, 15L, 15M, 15N, 15O:
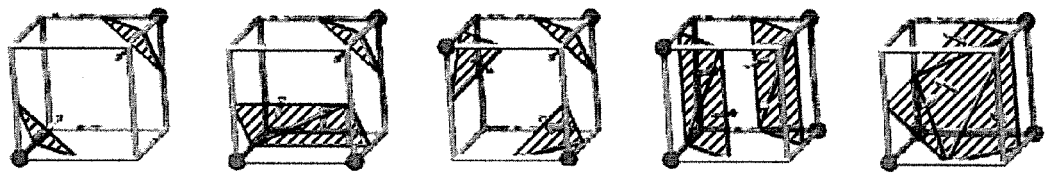

The triangle pattern indicates not only a single triangle pattern but also a polygon pattern constituted by a plurality of triangle patterns. The cells possessing various triangle patterns as shown in FIGS. 15A, 15B through 15O are stored in the storage apparatus 24 in advance, and the step S23 obtains a corresponding triangle pattern by searching the registered data.

Then the process calculates apex positions of each triangle pattern (i.e., a triangle) obtained in the step S23 (S24), followed by storing data of the triangles having information of the apex positions (S25).

{Volume Calculation of a Gap Area based on Voxel Data}

FIG. 16 is a flow chart showing a detail of the process of the step S7 shown in FIG. 5.

A cell has eight apexes V1 through V8, with the voxel values Cm (where m=1 through m) of the individual apexes Vm being either "0" or "1". Therefore, the combinations of the eight apexes V1 through V8 are 256 ways. That is, there are 256 ways of values which a volume of the inside of the cell can possibly take. The present embodiment is configured to define 256 kinds of patterns of volume values in the inside of the cell as "volume pattern". And it is configured to equip the built-in memory of the CPU 21 with counters cnt [p] (where p=1 through 256) for counting the number of these individual volume patterns individually.

Now, a description is of the flow chart shown by FIG. 16.

The process first initializes the aforementioned 256 pieces of counters cnt [p] (where p=1 through 256) to "0" (S31), followed by carrying out the processes of the steps S32 through S35 for i=1 through Nx−1, j=1 through Ny−1, and k=1 through Nz−1.

It then structures a cuboid (i.e., a cell) with its origins being the respective centers of eight voxels, i.e., a[i][j][k], a[i][j][k+1], a[i][j+1][k], a[i][j+1][k+1], a[i+1][j][k], a[i+1][j][k+1], a[i+1][j+1][k] and a[i+1][j+1][k+1] (S32).

It then obtains voxel values Cm (where m=1 through 8) of eight apexes Vm of the cell (S33), and searches a volume pattern p corresponding to the combination of {C1, C2 through C8} (S34). Each volume pattern p corresponding to the combination of eight voxel values C1, C2 through C8 is registered as a database within the storage apparatus 24 in advance. A configuration of the database is described later.

It then increments, by "1", a value of the counter cnt [p] corresponding to the volume pattern p searched in the step 34 (S35).

As the processes of the steps S32 through S35 are completed for all the cells within the calculation area, the process calculates a volume Vol [p] corresponding to the volume pattern p (S36). The volume Vol [p] is determined by the size of a cell. The volume Vol [p] corresponding to the volume pattern p is also registered in the database.

Then it calculates a ΣVol [p]*cnt [p] (where Σ is the grand total for p=1 through 256), and obtains a volume of a gap area as a result of the calculation (S37).

{Database for Searching a Volume Corresponding to a Volume Pattern}

FIGS. 17A and 17B are diagrams showing a structure of the database for use in the steps S34 and S36 shown in FIG. 16.

As described above, the present embodiment is configured to allocate the signs V1 through V8 to eight apexes of a cell as shown in FIG. 17A. As shown in FIG. 17B, 256 kinds of volume patterns, i.e., the patterns 1 through 256, are registered in a database 100, with the combination of voxel values "{C1, C2 through C8}" of the apexes V1 through V8 and "volume of a gap area" being registered for each of the individual volume patterns. FIG. 17B shows "voxel value of a cell" which is for making a voxel value for each volume pattern comprehensive in terms of image, and therefore it is not actually registered in the database 100.

The pattern 1 is a volume pattern of which the voxel values C1 through C8 of the apexes V1 through V8 are all "1", with "{1,1,1,1,1,1,1,1}" (i.e., the combination of voxel values) and "0" (i.e., the volume of a gap area) being registered for the aforementioned pattern. And the pattern 2 is a volume pattern of which only the C1 is "0" and the C2 through C8 are all "1", and of which the volume of the gap area is L/48. The pattern 3 is a volume pattern of which the C1 and C2 are "0" and the C3 through C8 are all "1", and of which the volume of the gap area is L/8. Here, L denotes the volume of a cell. Note that the "{C1, C2 through C8}" and "volume of a gap area" are registered for the patterns 4 through 256 in the database 100, while they are omitted in the showing herein.

The step S34 shown in FIG. 16 obtains a volume pattern p by searching the database 100 with the {C1, C2 through C8} as key. The step S36 searches the database 100 with the obtained volume pattern p as key, thereby obtaining a volume Vol [p] of the gap area.

The present embodiment is configured to utilize a database in which volumes corresponding to the patterns of a cell as described above, thereby enabling a high speed calculation of a volume of a gap area of the inside of a product. Note that a gap space in the inside of a product is sometimes described as "gap space" in the following description for simplicity.

{Cutout of External Feature of Component by Using a Convex Hull Structure}

A cross-sectional image includes not only an image of a product but also an image of an external feature of the product. The present embodiment is configured to cut out not only an image of a component part of a product but also an image of an external feature thereof from a cross-sectional image, thereby extracting only an image of a gap area of the product from the cross-sectional image.

Figure 18:
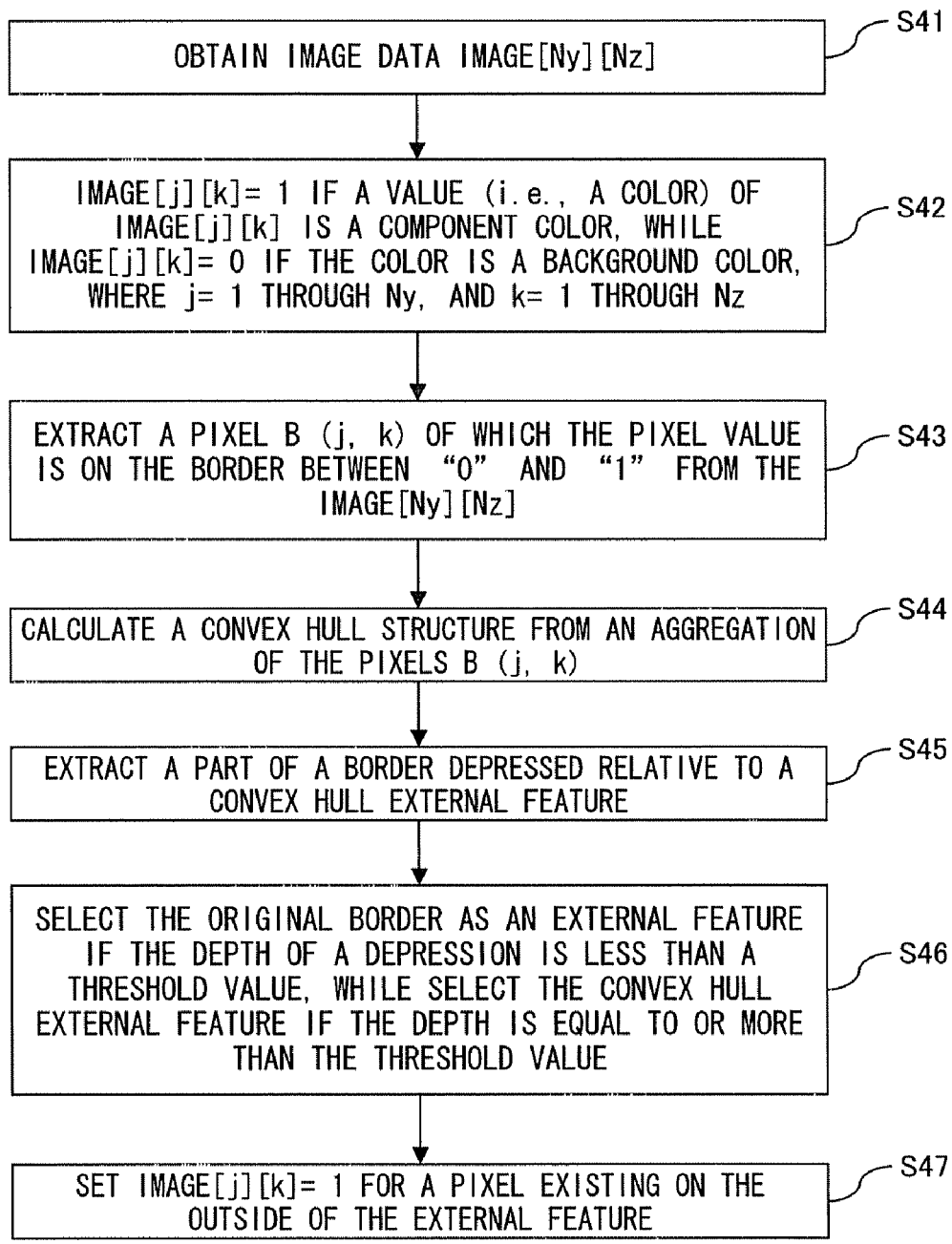
FIG. 18 is a flow chart showing an algorithm of a method for extracting a gap area from the inside of a convex hull by using a convex hull structure as a cutout of an external feature of a component (i.e., a 3D model).

FIG. 18 is a flow chart showing an algorithm of a method for extracting a gap area from the inside of a convex hull by using a convex hull structure as a cutout of an external feature of a 3D model of a product. The flow chart shows a process relating to a cross-sectional image which is cut out in the i-th place of the x direction and the process is carried out for i=1 through Nx.

In the showing of FIG. 18, the processes of the step S15 and thereafter shown in FIG. 11 are shown for avoiding a duplication of description. The step S41 shown in FIG. 18 carries out the same process as in the step S15 of FIG. 11.

The process first obtains image data Image [Ny][Nz] (S41) and sets Image[j][k]=1 if the value (i.e., a color) of the Image

[j][k] is a component color, while sets the Image[j][k]=0 if the color is a background color, where j=1 through Ny-1, and k=1 through Nz-1 (S42).

By the process of the step S42, an image 112 of the inside of a component (i.e., a product) is painted out with "1" (which is black in the drawing) in a cross-sectional image 110 as shown in FIG. 19A.

Then the process extracts a pixel B(j, k) of which the pixel value is on the border between "0" and "1" in the cross-sectional image 100 based on the Image[Ny][Nz] (S43).

By the process of the step S43, border lines 112 are extracted from the cross-sectional image 110 as shown in FIG. 19B.

Then the process calculates a convex hull structure from an aggregation of the pixels B(j, k) and cuts out an external feature of the convex hull (S44). A calculation of the convex hull structure uses for example a method noted in "Computer Geometry: Algorithm and Application" (Translated by ASANO, Tetsuo, First Edition, Jan. 15, 2000, published by Kindai kagaku sha Co., Ltd.).

By the process of the step S44, a convex hull external feature 113 (i.e., the bold line part of FIG. 19C) is extracted from the cross-sectional image 110 as shown in FIG. 19C.

Then the process extracts a part, which is depressed relative to the convex hull external feature, from the convex hull external feature and the border lines 112 (S45).

By the process of the step S45, depressed parts 114a and 114b (i.e., parts enclosed by dotted lines) relative to the convex hull external feature 113 are extracted as shown in FIG. 19D.

The process then examines a depth of the depressed part relative to the convex hull external feature based on the depressed parts and selects the original border as an external feature (i.e., an external feature of the product) if the depth is less than a threshold value, while selects the convex hull external feature as an external feature if the depth is equal to or more than the threshold value (S46).

By the process of the step S46, the depth d1 of the depressed part 114a and the depth d2 between the front edge and convex hull external feature 112 of the depressed part 114b are evaluated as to whether or not they are equal to or greater than a threshold value as shown in FIG. 19E. Then, if the d1 is less than the threshold value and the d2 is equal to or greater than the threshold value, only the depressed part 114a is judged as the external feature. As a result, an eventual external feature 115 of the component (i.e., the product) is determined as shown in FIG. 19F.

The process then sets, to "1", the Image[i][j] of a pixel existing outside of the aforementioned eventually external feature in the cross-sectional image (S47).

By the process of the step S47, the white part of an image 116 compounding the parts which are painted out in the steps S42 and S47, respectively, is eventually obtained as an image of the gap area of the inside of the product as shown in FIG. 19G.

The present embodiment is configured to utilize a convex hull structure, thereby making it possible to discern an image of the external feature of a product (i.e., a component) from an image of the inside thereof, and therefore extract accurately the image of a gap area of the inside of the product. In the case of a depressed part existing on a surface part of a product, it is also possible to extract an image of a depressed part of the inside of the product (i.e., a gap area of the product) more accurately by judging, in a cross-sectional image, whether the image of the depressed part is an image of a depression in the inside of the product or that of a depression on the outside thereof.

{Compounding of Cells}

The present embodiment is configured to integrate two adjacent cells (i.e., cuboids) into a single cell by compounding them in the case that the two adjacent cells are of the same pattern, thereby enabling a reduction of the number of cells.

Figure 20A:
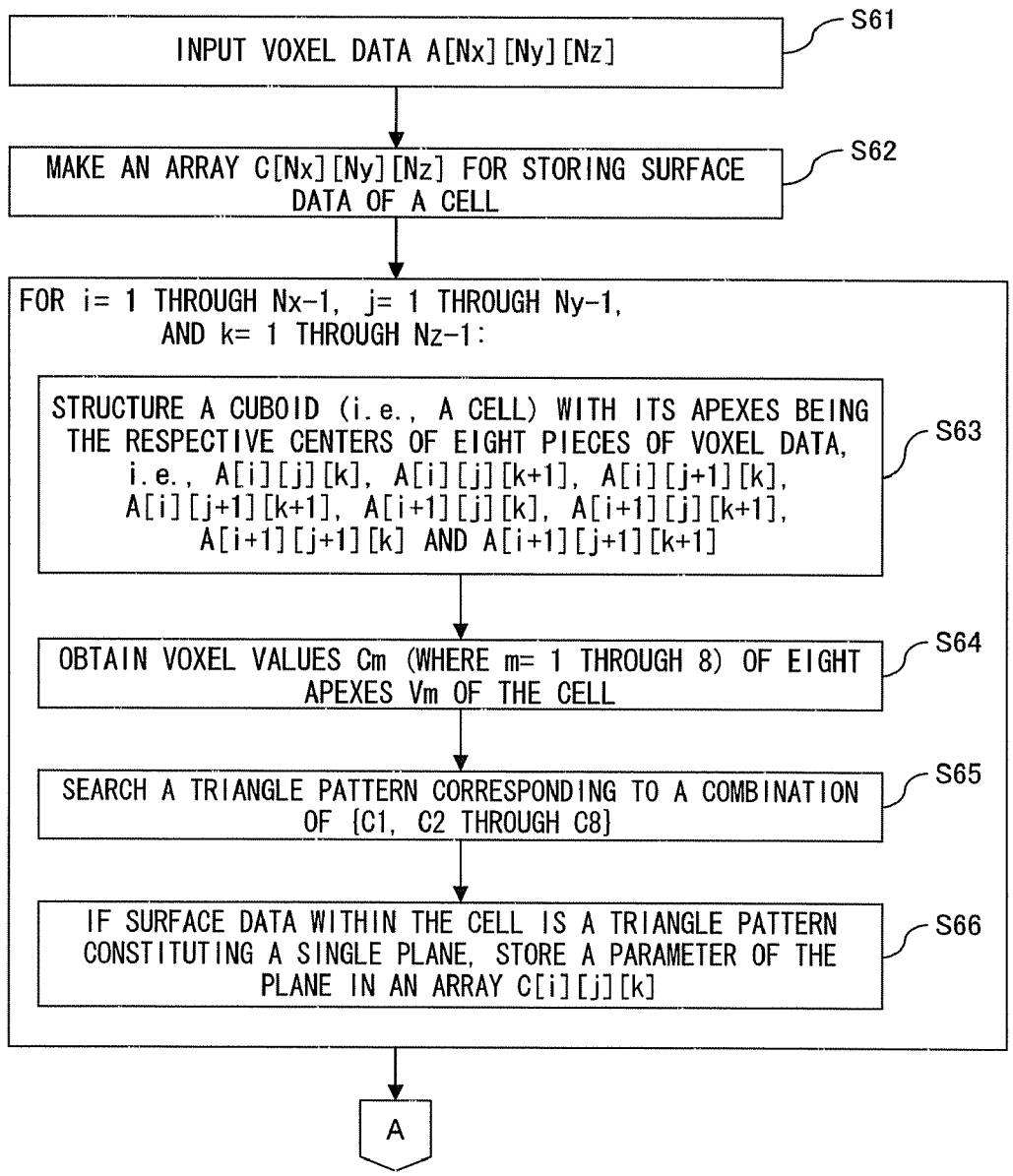
FIG. 20A is a flow chart showing a method for compounding cells (part 1).
Figure 20B:
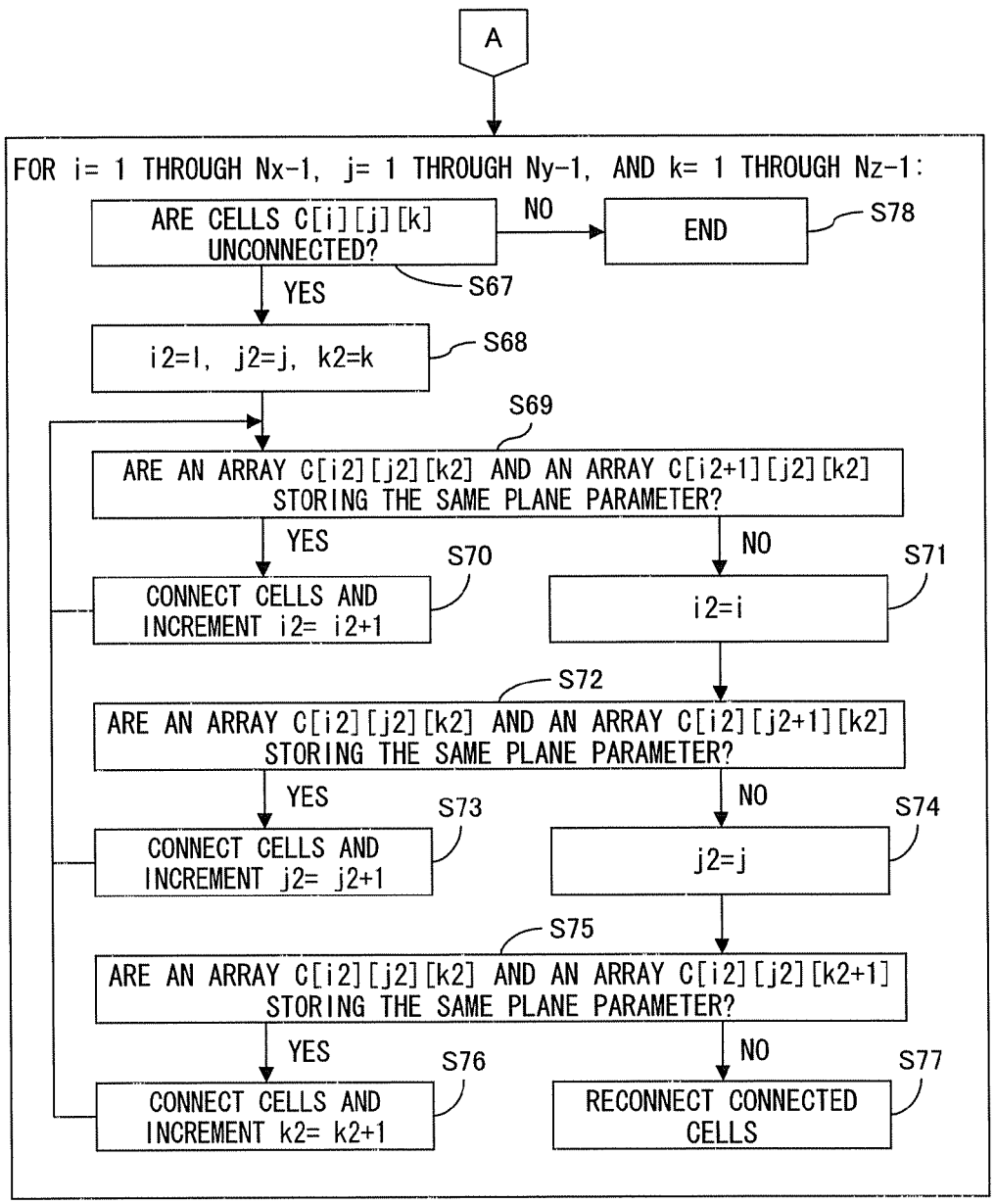
FIG. 20B is a flow chart showing a method for compounding cells (part 2).

FIGS. 20A and 20B are a flow chart showing a method for compounding the cells.

First, voxel data a[Nx][Ny][Nz] is input (S61). Then the process makes an array C[Nx][Ny][Nz] for storing surface data of a cell (S62) This array is a three-dimensional array consisting of Nx by Ny by Nz pieces of elements.

Then the process carries out processes of the following steps S63 through S66 for i=1 through Nx-1, j=1 through Ny-1, and k=1 through Nz-1. The processes of the steps S63 through S65 are the same as those of the steps S21 through S23 shown in FIG. 12.

Then the process structures a cell (i.e., a cuboid) with its origins being the respective centers of eight pieces of voxel data, i.e., a[i][j][k], a[i][j][k+1], a[i][j+1][k], a[i][j+1][k+1], a[i+1][j][k], a[i+1][j][k+1], a[i+1][j+1][k] and a[i+1][j+1][k+1] (S63).

It then obtains voxel values Cm (where m=1 through 8) of eight apexes Vm of the cell (S64), and searches, and obtains, a pattern corresponding to a combination of {C1, C2 through C8} (S65). Then, if surface data within the cell is a pattern constituting a single plane, the process stores a parameter of the plane (i.e., a plane parameter) in an array C[i][j][k] (S66).

Figures 21A, 21B:
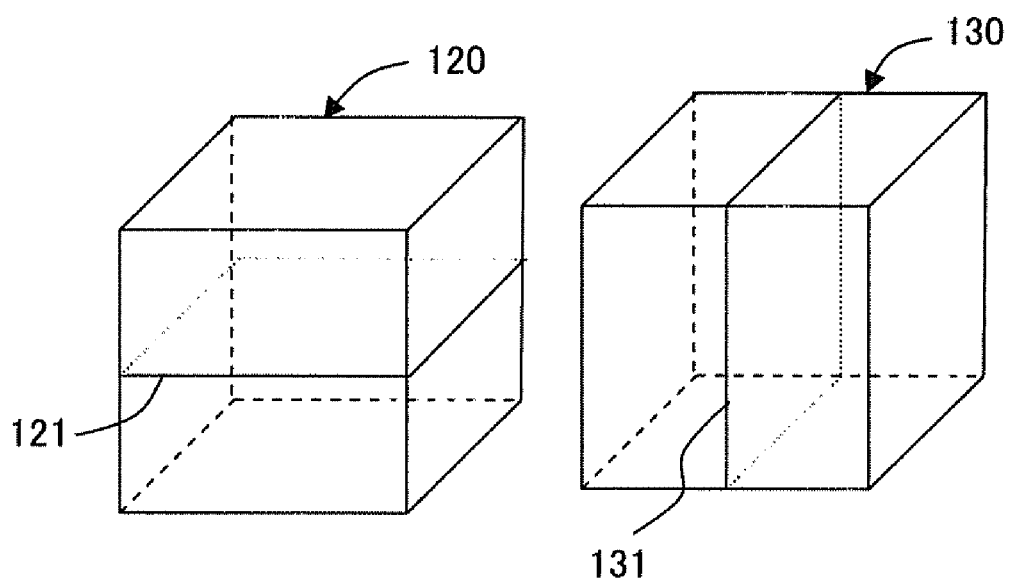
FIGS. 21A and 21B are diagrams exemplifying patterns of which surface data within a cell becomes a single plane.

FIGS. 21A and 21B are diagrams exemplifying patterns of which surface data within a cell constitutes a single plane.

The surface data 121 within a cell 120 shown in FIG. 21A is a single rectangle parallel with the xy plane. The surface data 131 within a cell 130 shown in FIG. 21B is a rectangle parallel with the yz plane. An equation of a plane is ax+by+cz+d=0, and the parameters are a, b, c and d, where $a^2+b^2+c^2=1$.

Then the process carries out processes of the steps S67 through S78 for i=1 through Nx-1, j=1 through Ny-1, and k=1 through Nz-1. Note that the following description expresses a cell corresponding to an array C[i][j][k] storing the plane parameter as a cell C[i][j][k].

The process discerns whether the cell C[i][j][k] is unconnected (S67) and, if unconnected, changes to i2=i, j2=j and k2=k (S68). Contrarily if not unconnected, it ends the process of the cell C[i][j][k] (S78).

Subsequent to the step S68, the process discerns whether or not an array C[i2][j2][k2] and an array C[i2+1][j2][k2] store the same plane parameter (S69) and, if they store the same plane parameter, it shifts to the step S70, otherwise it shifts to the step S71.

In the step S70, it connects the cell C[i2][j2][k2] to the cell C[i2+1][j2][k2] and increments the value of i2 by "1", followed by returning to the step S69. In the step S71, it resets the value of i2 to "i" and shifts to the step S72.

The next description is of the processes in the steps S69 and S70 by referring to FIGS. 22A through 22F.

Let it be assumed that a cell C[i][j][k] is a cell 141 having a single plane 141p as shown in FIG. 22A. In such a case, if a single plane 142p of a cell 142 (i.e., the cell C[i+1][j][k]) adjacent to the cell 141 in the x direction is of the same pattern as the single plane 142p of the cell 141 as shown in FIG. 22C, the process connects these cells 141 and 142 together as shown in FIG. 22E and makes a cuboid 152 having a single plane 152p. Contrarily, if a cell adjacent to the cell 141 in the x direction does not have the same single plane, the cell 141 is not connected by the adjacent cell as shown in FIG. 22D.

Then the process carries out the same process as for the cell 141 for a cell adjacent to the cell 142 in the x direction. Then, if a cell 143 adjacent to the cell 142 has a single plane 143*p* of the same pattern as the single plane 142*p* of the cell 142 as shown in FIG. 22A (c1), the process connects the cell 143 to the cuboid 152 and makes a cuboid 153 having a single plane 153*p* as shown in FIG. 22F.

It carries out the similar process for cells of which the value of "i" is the same, that is, the cell 143 and thereafter which is parallel with the cell 141 in the x direction, until an adjacent cell which does not have the same single plane appears. As a result, cells are connected together if the cells, each of which has a single plane of the same pattern, are continuously placed in the x direction.

The subsequent steps S72 and S73 carries out the same process for the y direction as in the above described steps S69 and S70.

The process discerns whether or not an array C[i2][j2][k2] and an array cell C[i2][j2+1][k2] have the same plane parameter (S72) and, if they do, the process shifts to the step S73, otherwise it shifts to the step S74.

In the step S73, it connects the cell C[i2][j2][k2] and cell C[i2][j2+1][k2] together, increments the value of j2 by "1" and returns to the step S69.

In the step S74, it resets the value of j2 to "j" and shifts to the step S75.

FIGS. 23A through 23F are diagrams describing the processes of the steps S72 and S73.

In the case of shifting to the step S72 in the state of FIG. 22C, the process examines whether or not the single plane 141*p* of the cell 141 (i.e., the cell C[i2][j2][k2]) and the single plane 144*p* of the cell 144 (i.e., the cell C[i2][j2+1][k2]) which is adjacent to the cell 141 in the y direction are of the same pattern in the step S72 and, if they are of the same pattern, connects the cells 141 and 144 together as shown in FIG. 23A to make a cube connecting the cuboid 153 and cell 144 together as shown in FIG. 23D in the step S73.

Then the process examines whether or not the plane pattern of a cell 142 and that of a cell (not shown herein) adjacent to the cell 142 in the y direction are the same and, if they are different, carries out the process of the step S72 for i2=i+1, followed by examining whether or not the single plane 142*p* of the cell 142 (i.e., the cell C[i2+1][j2][k2]) and the single plane 145*p* of the adjacent cell 145 (i.e., the cell C[i2+1][j2+1][k]) in the y direction are the same pattern. If they are the same pattern, it connects the cells 142 and 145 together, makes a cuboid 155 having the single plane 155*p* and makes a body connecting the cuboid 155 and a cuboid 153.

Then, if the cell 145 and a cell (not shown herein) adjacent thereto in the y direction do not have the same plane pattern, the process resets the value of j2 to "j". Then it performs the process of the step S72 again for i2=i+2 and examines whether or not the single plane 143*p* of the cell 143 (i.e., the cell C[i2+2][j2][k2]) and the single plane 146*p* of a cell 146 (i.e., a cell C[i2+2][j2+1][k]) are the same pattern. If they are the same pattern, it connects the cells 143 and 146 together as shown in FIG. 23C, makes a cuboid 156 having a single plane 156*p* and makes a cuboid connecting the cuboids 156 and 153 together.

The steps S75 and S76 carry out the same processes for the z direction as in the above described steps S69 through S71.

The process discerns whether or not the plane parameter of an array C[i2][j2][k2] and that of an array C[i2][j2][k2+1] are the same (S75) and, if they are the same, connects a cell C[i2][j2][k2] and a cell C[i2][j2][k2+1] together, followed by incrementing the value of k2 by "1" (S76) and returning to the step S75. Contrarily, if the step S75 discerns that both the plane parameters are not the same, it reconnects the connected cells (S77).

In the process of the step S76, although it is not shown herein, the process connects between adjacent cells having the same plane pattern among cells placed in the z direction in the same manner as in the processes in the above described x and y directions.

In the process of the step S77, it reconnects cuboids, which connects the cuboids 153 and 156 together as shown in FIG. 23F for example, thereby making a cuboid 160 having a single plane pattern 160*p* as shown in FIG. 24.

As such, larger cells are made by continuing the processes of connecting together, the adjacent cells having a single plane of the same pattern in the x, y and z directions, respectively, for the cells existing in the entire calculation area, thereby enabling a reduction of the number of cells.

The present embodiment is configured in a manner that the number of cells can be decreased, thereby enabling a speed-up a volume calculation of a gap space. Meanwhile, in the case of calculating the volume by using a database, the utilization of a database registering a volume pattern corresponding to the cuboid (i.e., the cell) obtained by connecting the above described cells and registering a volume of a gap area corresponding to the aforementioned volume pattern, in addition to the volume patterns shown in FIG. 17, enables a higher speed calculation of the volume of the gap area.

Note that the above described embodiment exemplifies the connection of cells having a single plane, adjacent cells having a plurality of planes, however, can be connected together if at least one point or line segment on a plane within the cells are identical on the contact surfaces of the adjacent cells.

{Resolution Adjustment of Voxel Data}

Figure 25:
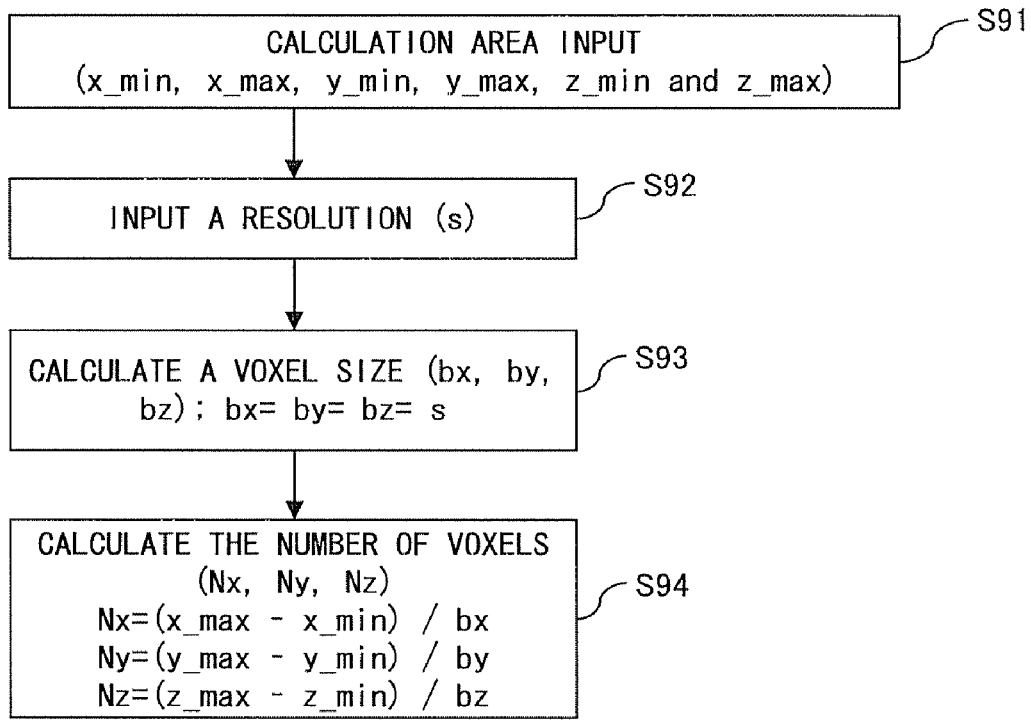
FIG. 25 is a flow chart showing a method for adjusting a resolution of voxel data according to the present embodiment.

FIG. 25 is a flow chart showing a method for adjusting a resolution of voxel data according to the present embodiment. The input in the flow chart is performed by way of the user input apparatus 22.

First is to input data (x_min, x_max, y_min, y_max, z_min and z_max) for specifying a size of a calculation area (S91).

FIG. 26A is a diagram showing a size of a calculation area specified by the input.

As shown in FIG. 26A, a coordinate (x_min, y_min, z_min) specifies that of an apex on the left low corner of a calculation area 200 which is a cuboid with the respective lengths in the x, y and z directions, i.e., x_max−x_min, y_max−y_min, and z_max−z_min, respectively, originating from the aforementioned apex.

Then a resolution (s) of the calculation area is input, and the process then calculates a voxel size (bx, by, bz) (S93). Here, bx=by=bz=s.

By this input, the edge lengths of a voxel 201 in the x, y and z directions are set as bx, by and bz, respectively, as shown by FIG. 26B.

Then the process calculates the numbers of voxels (Nx, Ny, Nz) (S94), where the Nx, Ny and Nz are obtained by calculating the following expressions:

$$Nx=(x\_max-x\_min)/bx$$

$$Ny=(y\_max-y\_min)/by$$

$$Nz=(z\_max-z\_min)/bz$$

FIGS. 26C and 26D show precision of a resolution of a calculation area corresponding to a resolution. FIG. 26C shows voxel data 201*a* in the case of a coarse resolution; and FIG. 26D shows voxel data 201*b* in the case of a fine resolution.

The present embodiment is configured to be capable of adjusting a resolution, thereby making it possible to carry out a generation of a 3D model of a gap space and a volume calculation thereof with a variable degree of precision. That is, a volume of a gap space is calculated with a high speed by specifying a low resolution (i.e., by making a voxel size larger) in the case of needing to examine the entirety of the gap space coarsely. Contrarily, a volume of a gap space is calculated by specifying a high resolution (i.e., by making a voxel size smaller) in the case of needing to examine the gap space minutely. In other words, it is possible to reduce the number of voxels while maintaining a degree of accuracy by expressing a part having a simple surface feature by coarse voxels and a part having a complex feature by fine voxels.

{Reduction of Memory Usage Volume by Dividing a Calculation Area}

Figure 27A:
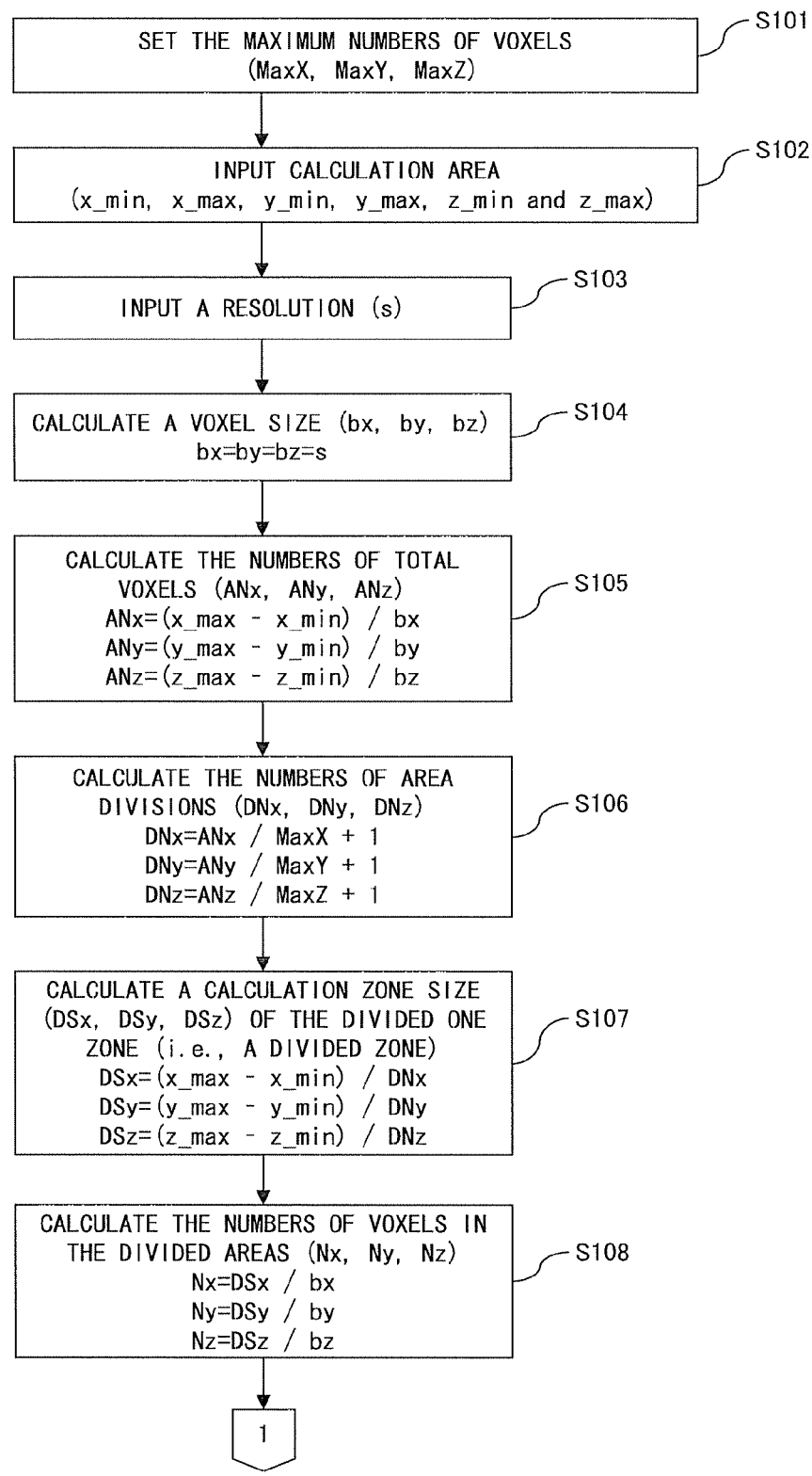
FIG. 27A is a flow chart showing a method for generating a 3D feature of a calculation area and calculating a volume of a gap area by dividing the calculation area (part 1).
Figure 27B:
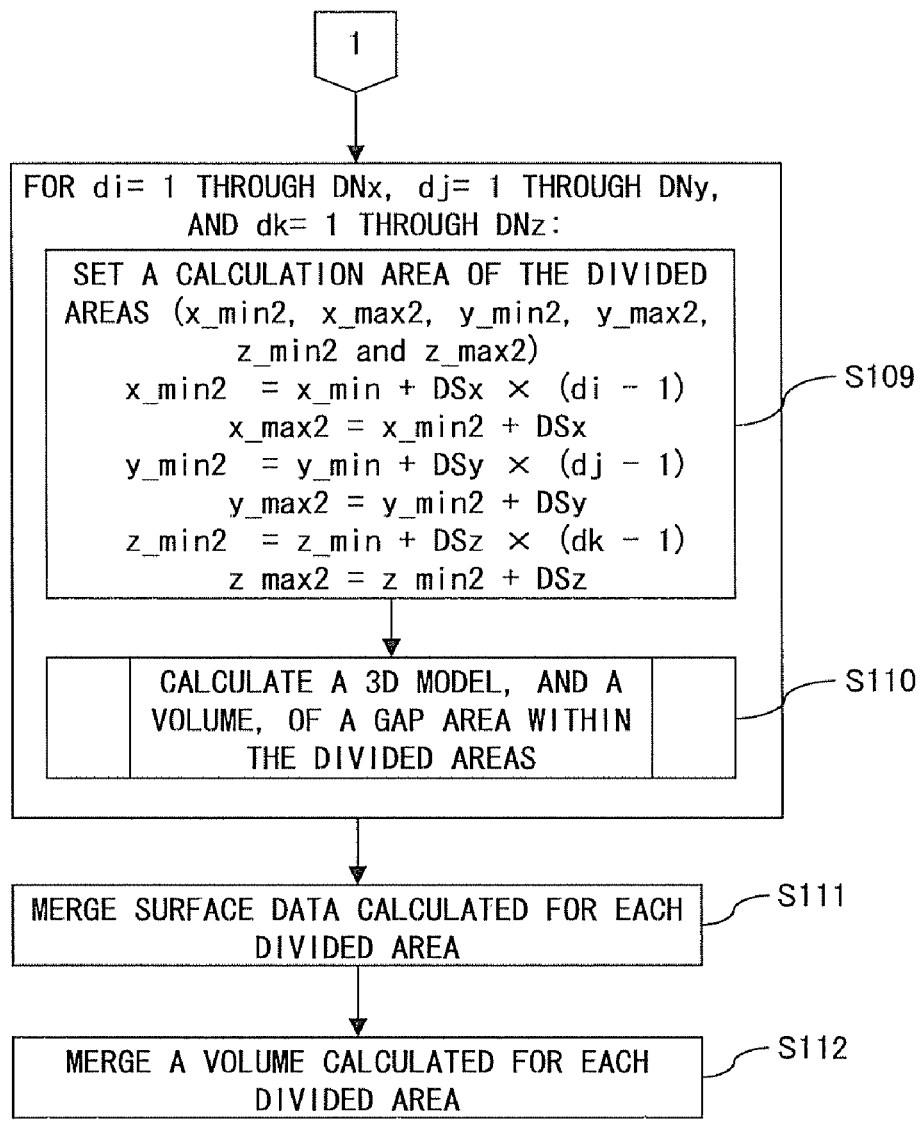
FIG. 27B is a flow chart showing a method for generating a 3D feature of a calculation area and calculating a volume of a gap area by dividing the calculation area (part 2).

FIGS. 27A and 27B are a flow chart showing a method for generating a 3D feature of a calculation area and calculating a volume of a gap area by dividing the calculation area.

A parameter input and setup in the flow chart are performed by way of the user input apparatus 22, and calculations are executed by the CPU 21 and GPU 231.

The maximum numbers of voxels (MaxX, MaxY, MaxZ) are set (S101), where,

MaxX: the number of voxels in the x direction;
MaxY: the number of voxels in the y direction; and
MaxZ: the number of voxels in the z direction.

Parameters (x_min, x_max, y_min, y_max, z_min and z_max) for defining a calculation area are input (S102). These parameters are the same as the ones input in the step S91 of FIG. 25 (refer to FIG. 26A).

A resolution (s) is input (S103), and the process calculates a voxel size (bx, by, bz) (S104), where bx=by=bz=s (refer to FIG. 26B).

It then calculates the numbers of total voxels (ANx, ANy, ANz) by the following expressions (S105):

$$ANx=(x\_max-x\_min)/bx$$

$$ANy=(y\_max-y\_min)/by$$

$$ANz=(z\_max-z\_min)/bz$$

It then calculates the numbers of area divisions (DNx, DNy, DNz) by the following expressions (S106):

$$DNx=ANx/MaxX+1$$

$$DNy=ANy/MaxY+1$$

$$DNz=ANz/MaxZ+1$$

Figure 28:
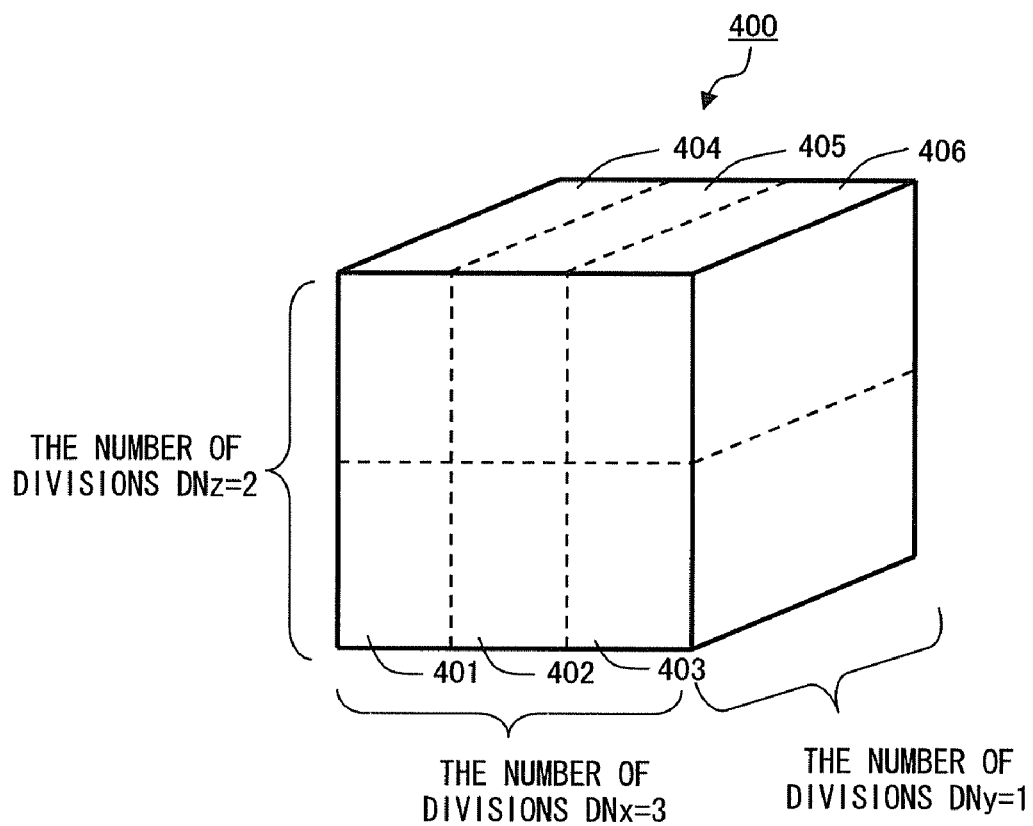
FIG. 28 is a diagram exemplifying a division of a calculation area.

FIG. 28 is a diagram exemplifying a division of a calculation area obtained at the time of dividing the calculation area by using the number of area divisions DNx, DNy, DNz.

FIG. 28 exemplifies the case of DNx=3, DNy=1 and DNz=2. In this case, a calculation area 400 is divided into three in the x direction, one in the y direction and two in the z direction, and therefore the calculation area 400 is divided into six divided areas 401 through 406.

A size (DSx, DSy, Dsz) of the calculation area of a divided area (i.e., one area as a result of dividing a calculation area by the number of the aforementioned area divisions) is calculated by the following expressions (S107):

$$DSx=(x\_max-x\_min)/DNx$$

$$DSy=(y\_max-y\_min)/DNy$$

$$DSz=(z\_max-z\_min)/DNz$$

The process then calculates the numbers of voxels (Nx, Ny, Nz) in the divided areas by the following expressions (S108)

$$Nx=DSx/bx$$

$$Ny=DSy/by$$

$$Nz=DSz/bz$$

It then carries out the following steps S109 and S110 for di=1 through DNx, dj=1 through DNy, and dk=1 through DNz. Note that a detail of the process in the step S110 is the same as in the steps S4 through S7 shown in FIG. 5 described above and therefore a detailed description is omitted here.

The process then calculates calculation areas (x_min2, x_max2, y_min2, y_max2, z_min2 and z_max2) of the divided areas by the following expressions (S109):

$$x\_min2=x\_min+DSx*(di-1)$$

$$x\_max2=x\_min2+DSx$$

$$y\_min2=y\_min+DSy*(dj-1)$$

$$y\_max2=y\_min2+DSy$$

$$z\_min2=z\_min+DSz*(dk-1)$$

$$z\_max2=z\_min2+DSz$$

It then calculates a 3D model, and a volume, of a gap area within the divided areas (S110).

It then merges the surface data of each divided area obtained by the repeated calculation in the above described steps S109 and S110, thereby generating surface data of the gap area of the 3D model (S111), followed by merging a volume of the gap area of each divided area obtained by the repeated calculation in the above described steps S109 and S110, thereby calculating a volume of the gap area of the 3D model (S112).

The present embodiment is configured to divide a calculation area into a plurality of areas and calculate for each divided area, thereby enabling a reduction of a memory volume used for the 3D model calculation and volume calculation of a gap space. This in turn enables those calculations even for a calculation area with a small memory capacity.

{Distributed Process of Divided Areas}

Figure 29:
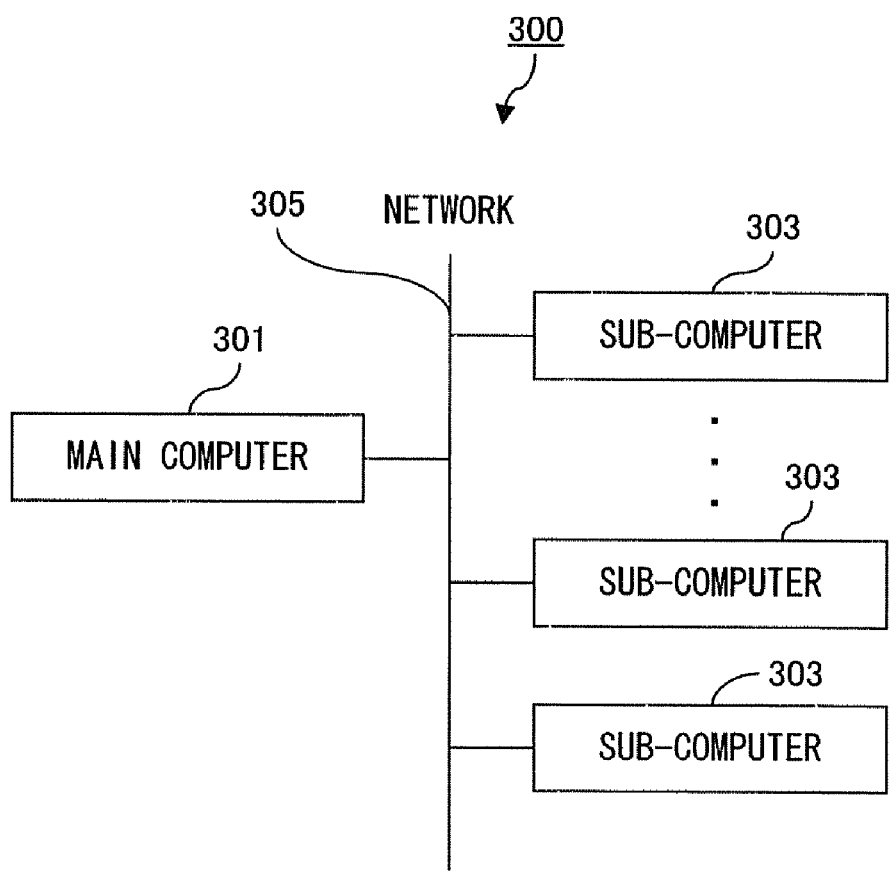
FIG. 29 is a diagram exemplifying a configuration of a system distributedly processing divided areas by a plurality of computers.

FIG. 29 is a diagram exemplifying a configuration of a system distributedly processing divided areas by a plurality of computers in the case of dividing a calculation area as described above.

The distributed process system 300 comprises a main computer 301, a plurality of sub-computers 303 and a network 305 connecting the main computer 301 and plurality of sub-computers 303.

The main computer 301 allocates the divided areas to each of the sub-computers 303. A sub-computer 303 executes calculations (the surface data calculation and volume calculation of a gap area) of a divided area, which is allocated by the main computer 301, and returns the calculation result thereto. The main computer 301 collects the calculation result from each of the sub-computers 303 and carries out the generation of a gap area, and volume calculation thereof, of a 3D model based on these execution results.

Figure 30:
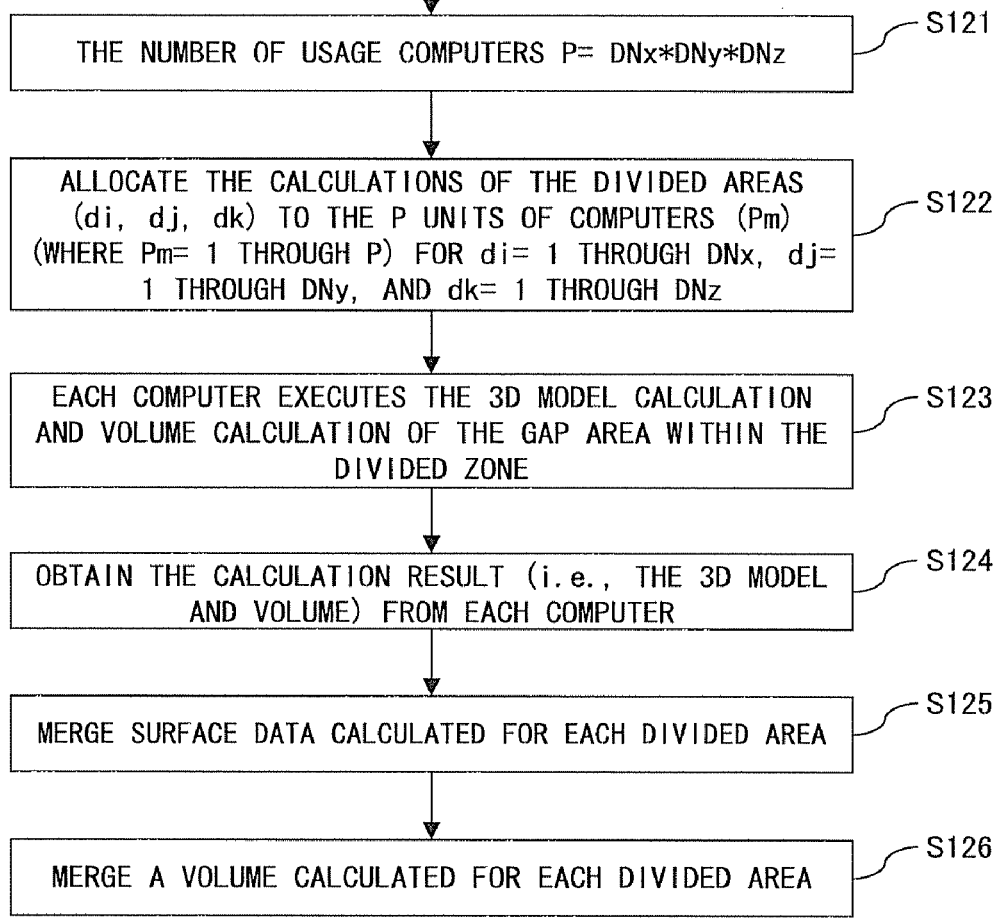
FIG. 30 is a flow chart showing a generation process of a 3D model, and a volume calculation process, of a gap area in the distributed process system shown by FIG. 29.
Figure 31:
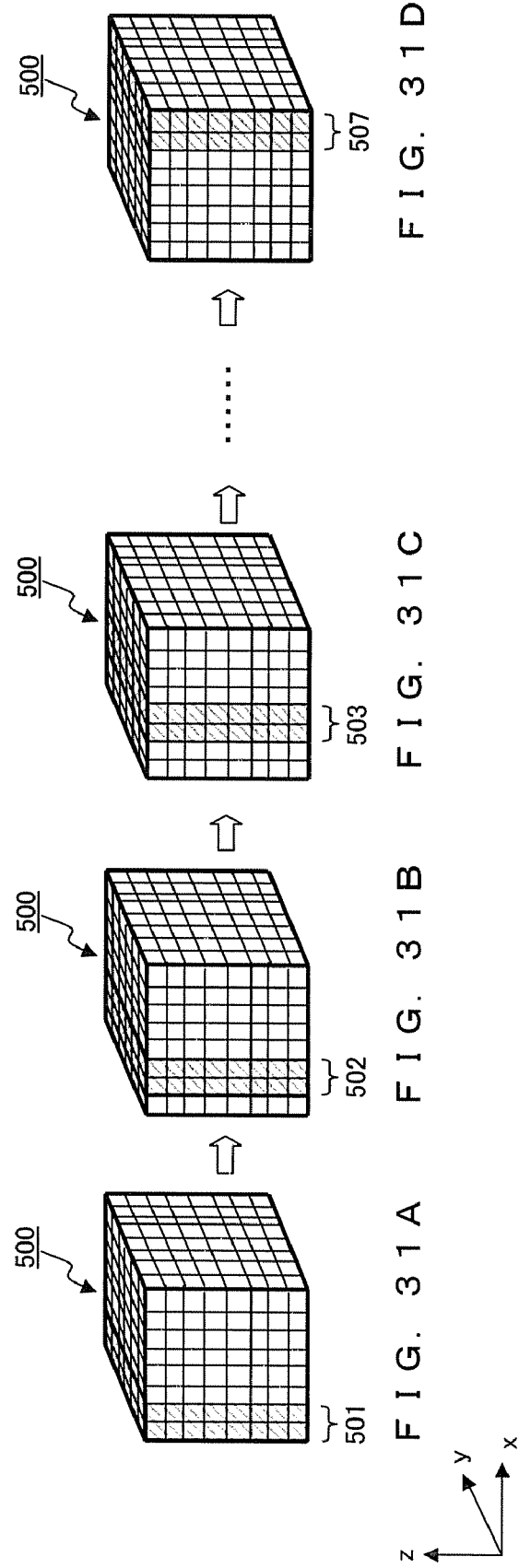
FIGS. 31A through 31D are diagrams exemplifying a method for sequentially calculating a calculation area according to the present embodiment.

FIG. 30 is a flow chart showing a generation process of a 3D model, and a volume calculation process, of a gap area in the distributed process system 300.

First, the main computer 301 executes the processes of the steps S101 through S108 shown in the flow chart of FIG. 27A, followed by obtaining the number of usage computers P by calculating the expression P=DNx*DNy*DNz (S121) and allocates the calculation of the divided areas (di, dj, dk) to the P units of sub-computers 303 (Pm) (S122), where the Pm=1 through P, the m is an identifier of a sub-computer 303, and di=1 through DNx, dj=1 through DNy, and dz=1 through DNz. That is, the present embodiment is configured such a manner that the main computer 301 allocates the calculation of one divided area to one unit of sub-computer 303 so as to carry out a parallel process of calculation of each divided area by the P units of sub-computers 303.

Each of the sub-computers 303 executes the 3D model calculation and volume calculation of the gap area within the divided area allocated from the main computer 301 (S123). The main computer 301 obtains a calculation result (i.e., the 3D model and volume of the gap area within the divided area) from each of the sub-computers 303 (S124) It then merges surface data of the gap area of each divided area to generate 3D feature data of the gap area (S125), and merges a volume of the gap area of each divided area to obtain a volume of the gap area (S126).

The present embodiment is configured to divide a calculation area and in parallel calculate each of the divided areas by a plurality of computers, thereby enabling a high speed execution of the generation of a 3D model and volume calculation of the gap area.

{Sequential Calculation of Divided Areas}

FIGS. 31A through 31D are diagrams exemplifying a method for sequentially calculating a calculation area according to the present embodiment.

As shown in FIGS. 31A through 31D, while dividing a calculation area 500 by the unit of two voxels in the x direction, the process sequentially carries out the 3D model calculation and volume calculation of a gap area in the area obtained by the division. In this event, the division is performed by sliding by one voxel.

The calculation area 500 shown in FIGS. 31A through 31D is constituted by Nx=8, Ny=6 and Nz=8. Therefore, the first calculation is performed for an area 501 (refer to FIG. 31A), the second calculation is performed for an area 502 (refer to FIG. 31B), the third is for an area 503 (refer to FIG. 31C) and so on, and the seventh is for an area 507 (refer to FIG. 31D), thusly one after another.

Figure 32:
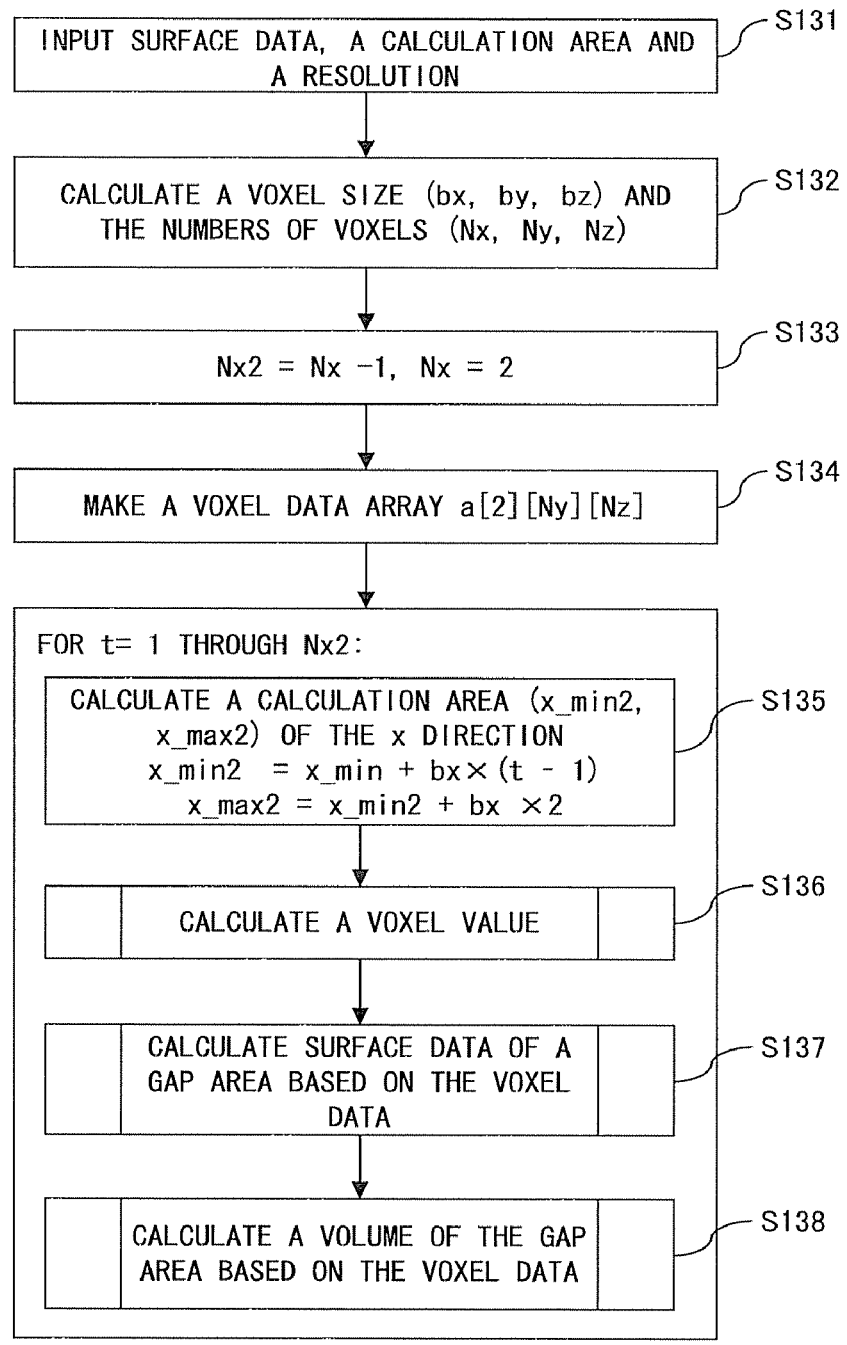
FIG. 32 is a flow chart showing a method for sequentially calculating a calculation area according to the present embodiment.

FIG. 32 is a flow chart showing a method for sequentially calculating a calculation area according to the present embodiment.

In the same manner as the steps S1 and S2 of the flow chart shown in FIG. 5, component surface data, a calculation area and a resolution are input (S131). The process calculates a voxel size (bx, by, bz) and the numbers of voxels (Nx, Ny, Nz) as described above based on the input calculation area and resolution (S132).

It then sets an Nx to the Nx2, making Nx=2 (S133), followed by making a voxel data array a[2][Ny][Nz] (S134). This array is for storing the voxel data of an area as the target of the present calculation.

It then carries out the following steps S135 through S138 for t=1 through Nx2.

It then calculates a calculation area (x_min2, x_max2) of the x direction (S135), where:

$$x\_min2 = x\_min + bx*(t-1)$$

$$x\_max2 = x\_min2 + bx*2$$

The process then calculates a voxel value (S136). It then calculates surface data of a gap area based on the voxel data stored in the array a[2][Ny][Nz] (S137). It then calculates a volume of the gap area based on the voxel data (S138). The processes of the steps S136 and S137 can be carried out by the same algorithm as the processes of the steps S6 and S7 shown in FIG. 5, with only exception being the difference in the array of the voxel data.

As described above, the present embodiment is configured to repeat the processes of the steps S135 through S138 for the Nx2 times while changing the value of t from 1, 2 through Nx2.

The storage array for generated voxel data is a[2][Ny][Nz] of which the size is 2*Nx*Nz in the case of the present embodiment. The method for calculating, at once, the entirety of a calculation area (shown in FIG. 5) needs to make an array a[Nx][Ny][Nz] of the size of Nx*Ny*Nz. Therefore, the present embodiment reduces the usage memory volume to two over Nx (i.e., 2/Nx) as compared to the aforementioned method.

Meanwhile, if the t is equal to or greater than two in the calculation of a voxel value in the step S136, it is possible to use the array a[2][Ny][Nz] storing the (t-1)-th calculation result as an array a[1][Ny][Nz] in the t-th calculation, thereby enabling a reduction of the number of calculation times to a half.

Incidentally, an alternative configuration may be to calculate sequentially in the y or z direction, while the above described embodiment is configured to calculate sequentially in the x direction.

The present embodiment is configured to carry out the generation of a 3D model, and the volume calculation, of a gap space at the stage of generating voxel data from a cross-sectional image of a part and the process sequentially for the entirety of the calculation area, thereby enabling a reduction of a memory volume used for those calculations. This in turn enables a computer equipped with a small memory capacity to generate a 3D model, and calculate a volume, of a gap space.

{Parallel Process by a Graphics Board}

The present embodiment is configured to separate the processes of the 3D model calculation and volume calculation of a gap area into a process by the graphics board 23 and other process, with the graphics board 23 calculating a voxel value and the CPU 21 calculating surface data of the gap area and a volume thereof based on the voxel value.

Figure 33:
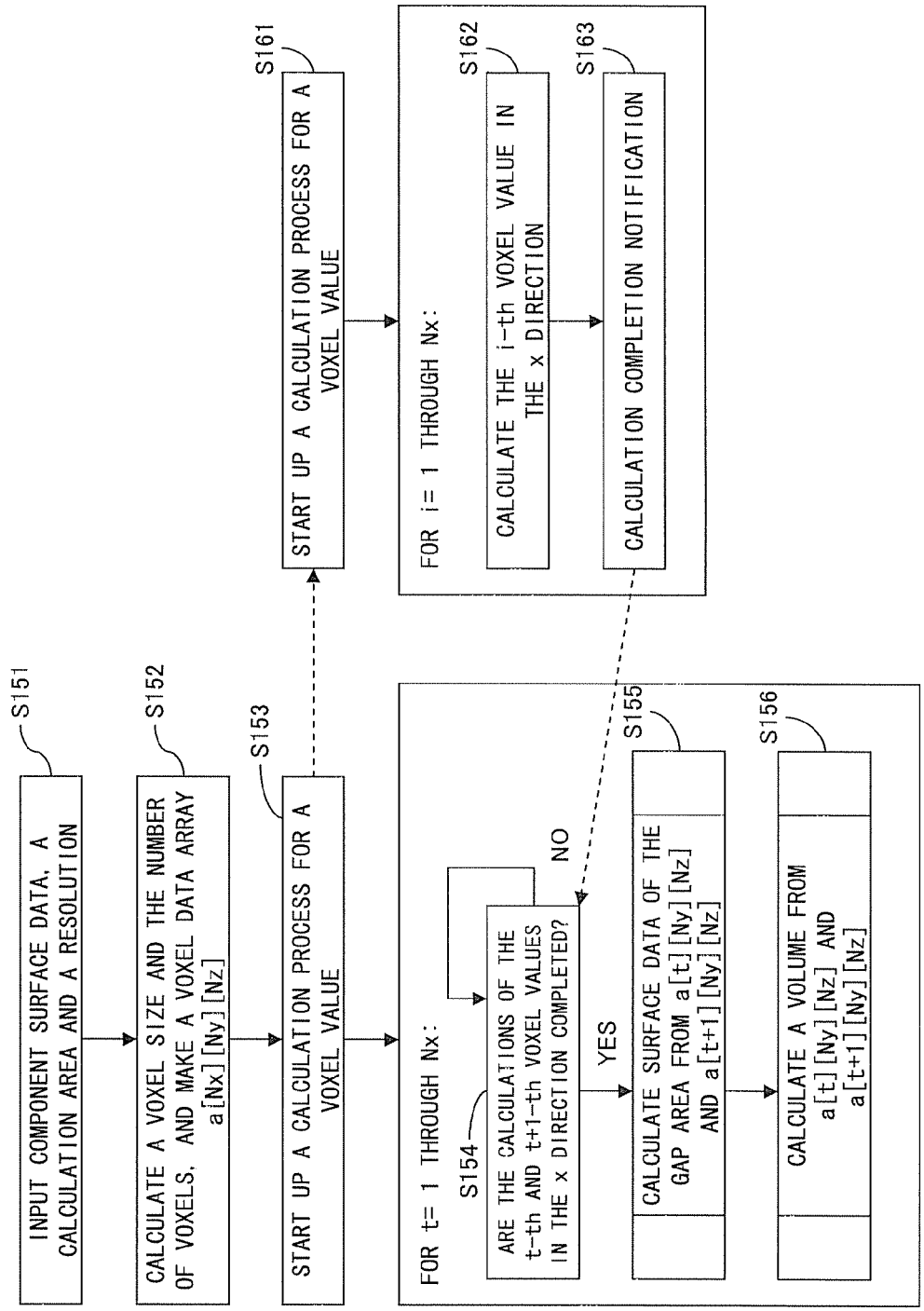
FIG. 33 is a flow chart showing a parallel process by a graphics board according to the present embodiment.

FIG. 33 is a flow chart showing a parallel process by a graphics board according to the present embodiment. Referring to FIG. 33, the processes of the steps S161 through S163 are carried out in the graphics board 23.

Component surface data, a calculation area and a resolution are input from the user input apparatus 22 (S151). The process calculates a voxel size and the number of voxels based on the input, and further makes a voxel data array a[Nx][Ny][Nz] (S152). The CPU 21 starts up a calculation process for a voxel value (S153), and shifts to the step S154.

Prompted by this, the graphics board 23 starts up a calculation process for a voxel value (S161). The graphics board 23 carries out the processes of the following steps S162 and S163 for i=1 through Nx.

It calculates the i-th voxel value in the x direction (S162) Upon finishing the calculation, it transmits a notification of completing the calculation to the CPU 21 (S163).

The CPU 21 carries out the processes of the following steps S154 and S156 for t=1 through Nx.

Based on the calculation completion notification from the graphics board 23, the CPU 21 discerns whether or not the calculations of the t-th and t+1-th voxel values in the x direction are completed (S154), repeating the process of the step S154 until the completion.

When discerning that the aforementioned calculation is complete in the step S154, the CPU 21 calculates surface data of the gap area based on the voxel values stored in the a[t][Ny][Nz] and a[t+1][Ny][Nz] (S155), followed by calculating a volume of the gap area based on the voxel values stored in the a [t][Ny][Nz] and a[t+1][Ny][Nz] (S156).

The present embodiment is configured to carry out the process executed by a computer and that executed by the graphics board in parallel, thereby enabling a high speed generation of a 3D model, and a volume calculation, of a gap space.

{Elimination of Voxel in Minute Gap Area}

The present embodiment is configured to not extract a gap area of no more than a certain size, thereby attempting to shorten the time required for the generation process of a 3D model of the gap area and the volume calculation time thereof.

FIGS. 34A through 34C are diagrams showing an example method for removing a voxel in a minute gap area surrounded by a calculation area. Referring to FIGS. 34A through 34C, a black rectangle indicates a voxel in a component area and a white rectangle indicates a voxel in a gap area.

As voxel data "a" shown in FIG. 34A is input, the process examines, regarding all voxels of a gap area within the voxel data "a", whether there is even a single voxel of a component area existing among voxels adjacent to the aforementioned all voxels (i.e., 26 pieces of adjacent voxels). It then converts a voxel of the gap area next to which a voxel of the component area exists into a voxel of the component (which is called an expansion process of a component area).

As a result, the voxels 600 through 613 of the gap area within the voxel data "a" are converted into voxels of the component area, and voxel data b shown by FIG. 34B is generated.

Conversely, the process then examines, regarding all voxels of the component area within the voxel data b, whether there is even a single voxel of the gap area existing among voxels adjacent to the aforementioned all voxels (i.e., 26 pieces of adjacent voxels). It then converts a voxel of the component area next to which a voxel of the gap area exists into a voxel of the gap area (which is called a compression process of a component area).

As a result, the voxels 604 through 613 within the voxel data b are reverted back to voxels of the gap area, and voxel data c shown by FIG. 34C is generated. Thus the voxels 600 through 603 are eventually removed (i.e., the voxels 600 through 603 are converted from that of the gap area into that of the component area) from the voxel data "a", resulting in compressing the component area of the voxel data "a".

As such, a minute area is removed from the extracted gap area by applying an expansion/compression method of an image process to voxel data.

FIG. 35 is a flow chart showing an algorithm of a voxel removal method within a minute gap area. Here, the size of the calculation area is assumed to be Nx*Ny*Nz.

Data of all voxels a[Nx][Ny][Nz] within a calculation area are input from the user input apparatus 22 (S171). The process makes an array b [Nx][Ny][Nz] for storing an intermediate result of a process (S172).

It carries out the following steps S173 through S177 for i=2 through Nx−1, j=2 through Ny−1, and k=2 through Nz−1, and an expansion process for a component area as shown by FIG. 34B.

It discerns whether the data of a voxel a[i][j][k] is "0" (S173) and, if it is "0" (i.e., a gap area), shifts to the step S174, while if it is "1" (i.e., a component area), shifts to the step S177.

It then discerns whether there is even a single voxel with its value being "1" (i.e., component area) existing among voxels adjacent to voxel a[i][j][k] (i.e., twenty six (26) voxels adjacent to the aforementioned voxel vertically, horizontally and diagonally in the x, y and z directions) in the step S174. And, if a voxel of the value being "1" exists, the process sets "1" for the voxel b[i][j][k] (S175), otherwise sets "0" therefor (S176). It then sets "1" for the voxel b[i][j][k] in the step S177.

Upon completion of the repeated process of the steps S173 through S177, the process carries out the processes of the following steps S178 through S182 for i=2 through Nx−1, j=2 through Ny−1, and k=2 through Nz−1.

It then discerns whether the value of the voxel b[i][j][k] is "1" (S178) and, if it is "1" (i.e., a component area), shifts to the step S179, while if it is "0" (i.e., a gap area), shifts to the step S182.

It then discerns, in the step S179, whether there is even a single voxel of which the value is "0" (i.e., a gap area) among voxels (i.e., twenty six voxels) adjacent to the voxel b[i][j][k] and, if a voxel of the value being "0" exists, sets "0" (i.e., a gap area) for the voxel a[i][j][k] (S180), otherwise sets "1" (i.e., a component area) for the voxel a[i][j][k] (S181). In the step S182, the process sets "0" for the voxel a[i][j][k].

Upon completion of the repeated process of the steps S178 through S182, the process of the present flow chart ends.

As a result, the component area is compressed and only voxels of a minute gap area are converted to those of a component area as shown by FIG. 34C.

The flow chart shown by FIG. 35 is an embodiment removing a gap of a width worth one voxel. In the case of removing a gap of a width worth two voxels, the algorithm is such as to perform an expansion and compression of a component area twice.

The present embodiment is configured not to extract a gap area of a certain size or less, thereby enabling a high speed generation of the 3D model and volume calculation of the gap area.

{A Partial Specification of a 3D Model}

The present embodiment is configured to make it possible to specify a part of a product model of a 3D model.

FIGS. 36A and 36B are diagrams showing a method for partially specifying a calculation area of such a product model (exemplifying a lap top PC).

In the case of specifying a part of a calculation area of a product model, specified first is the xy plane of the calculation area by the method shown in FIG. 36A, followed by specifying a yz area of the calculation area by the method shown in FIG. 36B. Thus specifying the xy plane and yz plane of the calculation area makes it possible to specify a 3D calculation area.

The xy plane specification of a calculation area is carried out by designating a rectangle 701 within a top view diagram 700 in the state of the display 25 displaying the top view 700 of a product model. The designation of the rectangle 701 is for example carried out by specifying the coordinate (x_min, y_min) of the left bottom apex 701a, and the coordinate (x_max, y_max) of the right top apex 701b, of a rectangle 701 (refer to FIG. 36A).

The yz plane specification of the calculation area is carried out by designating a rectangle 711 within a front view diagram 710 in the state of the display 25 displaying the front view diagram 710 of the product model. The designation of the rectangle 711 is for example carried out by specifying the coordinate (y_min, z_min) of the left bottom apex 711a, and the coordinate (y_max, z_max) of the right top apex, of a rectangle 711 (refer to FIG. 36B).

FIG. 37 is a flow chart showing an algorithm of a method for partially specifying the above described calculation area.

The top view diagram of a 3D product model is displayed in the display 25 (S191). The first rectangle (x_min, x_max, y_min, y_max) is input in the top view diagram as a calculation area by way of the user input apparatus 22 (S192).

The process displays a front view diagram of the 3D product model in the display 25 (S193). The second rectangle (y_min, y_max, z_min, z_max) is input within the front view diagram as a calculation area by way of the user input apparatus 22 (S194) A part of the 3D product model is specified as a calculation area as a result of inputting the first and second rectangles as described above.

The present embodiment is configured to specify a part of a 3D product model as a calculation area, thereby making it possible to carry out a generation of a 3D model, and a volume calculation, of a gap area only for a desired part.

The above described embodiment is configured to specify a calculation area by using a top view diagram and a front view diagram; the calculation area, however, may be specified by a top view diagram and a side view diagram. Alternatively, the calculation area may be specified only by the top view, front view or side view diagram.

Note that each of the above described embodiments is configured to adopt the orthogonal grid as grid data of a cross-sectional diagram, the present invention, however, does not limit the grid data to the orthogonal grid, and rather may use another grid such as of a hexagon. Also note that the present invention allows various modifications of embodiments within the scope thereof in lieu of being limited by the above described embodiments.

What is claimed is:

1. An image process apparatus for a three-dimensional (3D) model, comprising:
    a cross-sectional image cutout unit to cut out a plurality of cross-sectional images from surface data of a 3D model of a product;
    a cross-sectional image process unit to separate a cross-sectional image that is cut out by the cross-sectional image cutout unit into component area and gap area;
    a three-dimensional grid data generation unit to generate 3D grid data by layering cross-dimensional images obtained by the cross-sectional image process unit; and
    a three-dimensional model generation unit to generate a 3D model of a gap space of the inside of the product using 3D grid data generated by the three-dimensional grid data generation unit, wherein
    said cross-sectional image process unit
    extracts border lines from the cross-sectional image,
    calculates a convex hull structure from the border lines and generates a convex hull external structure,
    extracts a part, which is depressed relative to the convex hull external feature, from the convex hull external feature and the border lines,
    calculates a depth of the depressed part relative to the convex hull external feature by calculating a distance from said convex hull external feature to the border lines in a vertical direction to a segment of said convex hull external feature, and
    selects a border line as an external feature if the depth is less than a threshold value, while selects the convex hull external feature as an external feature if the distance is equal to or more than the threshold value.

2. The image process apparatus for a 3D model according to claim 1, further comprising:
    a first specification unit to specify a size of said cross-sectional image;
    a second specification unit to specify a resolution of the cross-sectional image; and
    an adjustment unit to adjust a grid size of said 3D grid data using the size and resolution of the cross-sectional image that are specified by the first and second specification units.

3. The image process apparatus for a 3D model according to claim 1, further comprising:
    a division unit to divide a 3D calculation space including surface data of a 3D model of said product, wherein
    said cross-sectional image process unit separates a cross-sectional image of each divided area obtained by the division unit into a component area and a gap space,
    said three-dimensional grid data generation unit generates 3D grid data of individual divided areas by layering cross-dimensional images of the respective divided areas obtained by the cross-sectional image process unit,
    said three-dimensional model generation unit generates a 3D model of a gap area of the inside of the product within each divided area using the 3D grid data of each divided area generated by the three-dimensional grid data generation unit, and
    said three-dimensional model generation unit generates a 3D model of a gap area of the inside of the product within each divided area based on the 3D grid data of each divided area generated by the three-dimensional grid data generation unit, and
    a 3D model of a gap area of the inside of the product is generated by integrating 3D models of gap areas of the inside of the product within the respective divided areas obtained by the cross-sectional image process unit, three-dimensional grid data generation unit and three-dimensional model generation unit.

4. The image process apparatus for a 3D model according to claim 3, further comprising
    a distributed processing unit to do distributed processing of a process for each of said divided areas carried out by said cross-sectional image process unit, three-dimensional grid data generation unit and three-dimensional model generation unit by the unit of divided area.

5. The image process apparatus for a 3D model according to claim 1, further comprising
    a division unit to divide a 3D calculation space including surface data of a 3D model of said product one after another, wherein
    said cross-sectional image process unit separates a cross-sectional image of a divided area obtained by the division unit into a component area and a gap area,
    said three-dimensional grid data generation unit generates 3D grid data of the divided area by layering cross-sectional images of the divided areas obtained by the cross-sectional image process unit,
    said three-dimensional model generation unit generates image data of a gap area of the inside of the product of the divided area using the 3D grid data of the divided area generated by the three-dimensional grid data generation unit, and
    said cross-sectional image process unit, the three-dimensional grid data generation unit and three-dimensional model generation unit processes, one by one, divided areas obtained by the division unit one after another, thereby generating a 3D model of a gap area of the inside of the product.

6. The image process apparatus for a 3D model according to claim 1, wherein said 3D grid data is voxel data, and said three-dimensional grid data generation unit removes a voxel of a minute empty area from said gap area by applying an expansion/compression process to the voxel data.

7. The image process apparatus for a 3D model according to claim 1, further comprising a partial specification unit to specify a part of a product, wherein said cross-sectional image cutout unit cuts out only a cross-sectional image of the part specified by the partial specification unit, and said cross-sectional image process unit, three-dimensional grid data generation unit and three-dimensional model generation unit apply the respective processes to a cross-sectional image cut out by the cross-sectional image cutout unit.

8. An image process apparatus for a three-dimensional (3D) model, comprising:

a cross-sectional image cutout unit to cut out a plurality of cross-sectional images from surface data of a 3D model of a product;

a cross-sectional image process unit to separate a cross-sectional image that is cut out by the cross-sectional image cutout unit into a component area and a gap area;

a three-dimensional grid data generation unit to generate 3D grid data by layering cross-dimensional images obtained by the cross-sectional image process unit; and a volume calculation unit to calculate a volume of a gap space of the inside of the product using the 3D grid data generated by the layered cross-dimensional images, wherein said cross-sectional image process unit extracts border lines from the cross-sectional image, calculates a convex hull structure from the border lines and generates a convex hull external structure, extracts a part, which is depressed relative to the convex hull external feature, from the convex hull external feature and the border lines, calculates a depth of the depressed part relative to the convex hull external feature by calculating a distance from said convex hull external feature to the border lines in a vertical direction to a segment of said convex hull external feature, and selects a border line as an external feature if the depth is less than a threshold value, while selects the convex hull external feature as an external feature if the distance is equal to or more than the threshold value.

9. The image process apparatus for a 3D model according to claim 8, wherein said volume calculation unit comprises:

a conversion unit to express said 3D grid data by using an orthogonal grid, and converting the 3D grid data into a 3D space constituted by a cuboid with its apexes being constituted by the eight adjacent grids, a storage unit to categorize the cuboid obtained by the conversion unit into patterns of combinations of values of the eight grids, and storing a volume of a gap area of the inside of the cuboid corresponding to each pattern of the cuboid, an obtainment unit to search in the storage unit using the pattern of the cuboid obtained by said conversion unit, and obtaining a volume of a gap part of the inside of the cuboid, and a calculation unit to calculate a volume of a gap area of the inside of a product using the volume of the gap part of the inside of each cuboid obtained by the obtainment unit.

10. The image process apparatus for a 3D model according to claim 8, further comprising:

a first specification unit to specify a size of said cross-sectional image;

a second specification unit to specify a resolution of the cross-sectional image; and an adjustment unit to adjust a grid size of said 3D grid data using the size and resolution of the cross-sectional image that are specified by the first and second specification units.

11. The image process apparatus for a 3D model according to claim 8, further comprising:

a division unit to divide a 3D calculation space including surface data of a 3D model of said product, wherein said cross-sectional image process unit separates a cross-sectional image of each divided area obtained by the division unit into a component area and a gap space, said three-dimensional grid data generation unit generates 3D grid data of individual divided areas by layering cross-dimensional images of the respective divided areas obtained by the cross-sectional image process unit, said volume calculation unit calculates a volume of a gap area of the inside of the product within each of the divided areas using 3D grid data of each divided area generated by the three-dimensional grid data generation unit, and a volume of a gap area of the inside of the product is calculated by calculating a grand total of volume of the gap area of the inside of the product within each divided area obtained by the cross-sectional image process unit, three-dimensional grid data generation unit and volume calculation unit.

12. The image process apparatus for a 3D model according to claim 11, further comprising a distributed processing unit to do distributed processing of a process for each of said divided areas carried out by said cross-sectional image process unit, three-dimensional grid data generation unit and volume calculation unit by the unit of divided area.

13. The image process apparatus for a 3D model according to claim 8, further comprising a division unit to divide a 3D calculation space including surface data of a 3D model of said product one after another, wherein said cross-sectional image process unit separates a cross-sectional image of a divided area obtained by the division unit into a component area and a gap area, said three-dimensional grid data generation unit generates 3D grid data of the divided area by layering cross-dimensional images of the divided areas obtained by the cross-sectional image process unit, said volume calculation unit calculates a volume of a gap area of the inside of the product of the divided area using 3D grid data of the divided area generated by the three-dimensional grid data generation unit, and said cross-sectional image process unit, the three-dimensional grid data generation unit and volume calculation unit process, one by one, the divided areas obtained by the division unit one after another, thereby calculating a volume of the gap area of the inside of the product.

14. The image process apparatus for a 3D model according to claim 8, further comprising a partial specification unit to specify a part of said product, wherein said cross-sectional image cutout unit cuts out only a cross-sectional image of a part specified by the partial specification unit, and said cross-sectional image process unit, three-dimensional grid data generation unit and volume calculation unit apply processes of the respective units to the cross-sectional image cut out by the cross-sectional image cutout unit.

15. A non-transitory medium storing a program to be executed by a computer, wherein said program makes the computer execute a process, said process comprising:

cutting out a plurality of cross-sectional images from surface data of a three-dimensional (3D) model of a product, separating a cross-sectional image into a component area and a gap area, generating 3D grid data by layering the cross-sectional images, and generating a 3D model of a gap space of the inside of the product using the 3D grid data, wherein the separating includes extracting a gap area, the extracting including:

extracting border lines from the cross-sectional image, calculating a convex hull structure from the border lines and generates a convex hull external structure, extracting a part, which is depressed relative to the convex hull external feature, from the convex hull external feature and the border lines, calculating a depth of the depressed part relative to the convex hull external feature by calculating a distance from said convex hull external feature to the border lines in a vertical direction to a segment of said convex hull external feature, and selecting a border line as an external feature if the depth is less than a threshold value, while selects the convex hull external feature as an external feature if the distance is equal to or more than the threshold value.

16. A non-transitory medium storing a program to be executed by a computer, wherein said program make the computer execute a process, said process comprising:

cutting out a plurality of cross-sectional images from surface data of a three-dimensional (3D) model of a product, separating a cross-sectional image into a component area and a gap area, generating 3D grid data by layering the cross-sectional images, and calculating a volume of a gap space of the inside of the product using the 3D grid data, wherein the separating includes extracting a gap area, the extracting including:

extracting border lines from the cross-sectional image, calculating a convex hull structure from the border lines and generates a convex hull external structure, extracting a part, which is depressed relative to the convex hull external feature, from the convex hull external feature and the border lines, calculating a depth of the depressed part relative to the convex hull external feature by calculating a distance from said convex hull external feature to the border lines in a vertical direction to a segment of said convex hull external feature, and selecting a border line as an external feature if the depth is less than a threshold value, while selects the convex hull external feature as an external feature if the distance is equal to or more than the threshold value.

17. An image process apparatus for a three-dimensional (3D) model, comprising:

a cross-sectional image cutout unit to cut out a plurality of cross-sectional images from surface data of a 3D model of a product;

a cross-sectional image process unit to separate a cross-sectional image cut out by the cross-sectional image cutout unit into a component area and a gap area;

a three-dimensional grid data generation unit to generate 3D grid data by layering cross-dimensional images obtained by the cross-sectional image process unit;

a three-dimensional model generation unit to generate a 3D model of a gap space of the inside of a product using 3D grid data generated by the three-dimensional grid data generation unit; and a volume calculation unit to calculate a volume of a gap space of the inside of the product using the 3D grid data generated by the layered cross-dimensional images, wherein said cross-sectional image process unit extracts border lines from the cross-sectional image, calculates a convex hull structure from the border lines and generates a convex hull external structure, extracts a part, which is depressed relative to the convex hull external feature, from the convex hull external feature and the border lines, calculates a depth of the depressed part relative to the convex hull external feature by calculating a distance from said convex hull external feature to the border lines in a vertical direction to a segment of said convex hull external feature, and selects a border line as an external feature if the depth is less than a threshold value, while selects the convex hull external feature as an external feature if the distance is equal to or more than the threshold value.

18. A non-transitory medium storing a program to be executed by a computer, wherein said program makes the computer a process, said process comprising of the steps of:

cutting out a plurality of cross-sectional images from surface data of a three-dimensional (3D) model of a product, separating a cross-sectional image into a component area and a gap area, generating 3D grid data by layering the cross-sectional images, generating a 3D model of a gap space of the inside of the product using the 3D grid data, and calculating a volume of a gap space of the inside of the product using the 3D grid data, wherein the separating includes extracting a gap area, the extracting including:

extracting border lines from the cross-sectional image, calculating a convex hull structure from the border lines and generates a convex hull external structure, extracting a part, which is depressed relative to the convex hull external feature, from the convex hull external feature and the border lines, calculating a depth of the depressed part relative to the convex hull external feature by calculating a distance from said convex hull external feature to the border lines in a vertical direction to a segment of said convex hull external feature, and selecting a border line as an external feature if the depth is less than a threshold value, while selects the convex hull external feature as an external feature if the distance is equal to or more than the threshold value.

* * * * *